United States Patent
Christini et al.

(10) Patent No.: US 6,439,592 B1
(45) Date of Patent: *Aug. 27, 2002

(54) TWO-WHEEL DRIVE TWO-WHEELED VEHICLE

(75) Inventors: Steven J. Christini; Michael J. Dunn, both of Philadelphia, PA (US); Louis J. Allora, Basking Ridge, NJ (US); Robert L. Pigeon, Conshohocken, PA (US); Jeremy T. Shook, Ballston Spa, NY (US)

(73) Assignee: Christini Technologies, Inc., Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/631,982

(22) Filed: Aug. 3, 2000

Related U.S. Application Data

(63) Continuation-in-part of application No. 09/372,160, filed on Aug. 11, 1999, now Pat. No. 6,182,991, which is a continuation-in-part of application No. 09/171,742, filed as application No. PCT/US97/06181 on Apr. 25, 1997, now Pat. No. 6,161,854.
(60) Provisional application No. 60/096,261, filed on Aug. 12, 1998, and provisional application No. 60/016,232, filed on Apr. 26, 1996.

(51) Int. Cl.[7] .............................................. B62M 1/00
(52) U.S. Cl. ..................... 280/230; 280/276; 180/223
(58) Field of Search ........................... 280/230, 240, 280/276, 279, 200; 180/211, 223; 74/665 F, 665 E

(56) References Cited

U.S. PATENT DOCUMENTS

| | | | |
|---|---|---|---|
| 451,811 A | 5/1891 | Crumb | |
| 1,107,990 A | * 8/1914 | Pamer | ........................ 180/223 |
| 1,139,622 A | 5/1915 | Yordi | |
| 2,358,035 A | * 9/1944 | Schwinn | ...................... 280/279 |
| 2,859,979 A | * 11/1958 | Himes | .......................... 280/279 |
| 3,024,860 A | 3/1962 | Nicolai | |

(List continued on next page.)

FOREIGN PATENT DOCUMENTS

| | | | |
|---|---|---|---|
| DE | 192323 | 10/1907 | |
| EP | 0 445 841 B1 | 2/1988 | |
| EP | 0 564 523 B1 | 12/1991 | |
| EP | 0 697 329 A1 | 12/1991 | |
| FR | 560717 | 10/1923 | |
| FR | 1141328 | * 8/1957 | ................. 180/223 |
| GB | 360735 | * 11/1931 | ................. 180/211 |
| GB | 1284821 | 8/1972 | |
| JP | 3213755 | * 9/1991 | ................. 180/223 |
| WO | WO 93/09992 | 5/1993 | |

OTHER PUBLICATIONS

Copy of copending application Ser. No.: 09/372,160, filed Aug. 11, 1999.
Copy of copending application Ser. No.: 09/676,677, filed Oct. 2, 2000.

*Primary Examiner*—Daniel G. DePumpo
(74) *Attorney, Agent, or Firm*—Cooley Godward LLP

(57) ABSTRACT

The present invention is a fully functioning two-wheel drive bicycle and embodiments thereof. The drive train which supplies power to the front wheel is incorporated into a modified frame and comprises a rear wheel driven by the traditional chain or shaft mechanism and the front wheel driven by a series of rigid shafts or other internalized drive systems. The front wheel drive is adaptable to all bicycle frame geometries including the double diamond mountain bike and road bicycle frame, touring, commuter and comfort bicycles, BMX, trials bicycles, and recumbent and tandem bicycles. The drive train lengthens and shortens in parallel with the shock-absorbing front fork and rear suspension. An engagement clutch, a one-way hub, and torque limiting clutch are also disclosed.

10 Claims, 26 Drawing Sheets

U.S. PATENT DOCUMENTS

| | | |
|---|---|---|
| 3,118,514 A | 1/1964 | Bowman |
| 3,268,025 A | 8/1966 | Fehn |
| 3,360,200 A | 12/1967 | Purtell |
| 3,785,676 A * | 1/1974 | Klein, Jr. .................... 280/279 |
| 3,936,076 A * | 2/1976 | Probst ........................ 280/276 |
| 3,955,828 A * | 5/1976 | Boudreau ................... 280/279 |
| 4,029,332 A | 6/1977 | Davis |
| 4,093,262 A * | 6/1978 | Koyama et al. ............ 280/279 |
| 4,397,369 A | 8/1983 | Read |
| 4,479,660 A | 10/1984 | Pattison |
| 4,611,684 A | 9/1986 | Geschwender |
| 4,773,662 A | 9/1988 | Phillips |
| 4,895,385 A | 1/1990 | Becoat |
| 5,004,258 A | 4/1991 | Becoat |
| 5,042,608 A | 8/1991 | Horiike et al. |
| 5,052,705 A | 10/1991 | Ringle |
| 5,054,572 A | 10/1991 | Parker |
| 5,101,946 A | 4/1992 | Lederman |
| 5,113,964 A | 5/1992 | Yamauchi |
| 5,116,070 A | 5/1992 | Becoat |
| 5,158,314 A | 10/1992 | Farras Pinos |
| 5,183,139 A | 2/1993 | Malecha |
| 5,184,838 A | 2/1993 | Becoat |
| 5,188,205 A | 2/1993 | Karp et al. |
| 5,224,725 A | 7/1993 | Erlston |
| 5,253,889 A | 10/1993 | Kaminski |
| 5,324,057 A | 6/1994 | Chartrand |
| 5,332,244 A | 7/1994 | Turner et al. |
| 5,390,773 A | 2/1995 | Proia |
| 5,390,946 A | 2/1995 | Spicer |
| 5,397,142 A | 3/1995 | Schwarzenbacher |
| 5,417,446 A | 5/1995 | Pileggi |
| 5,485,905 A | 1/1996 | Rader, III |
| 5,542,689 A | 8/1996 | Chalfant |
| 5,662,197 A | 9/1997 | Tabe |
| 6,161,854 A | 12/2000 | Christini et al. |
| 6,161,855 A | 12/2000 | Christini et al. |
| 6,182,991 B1 * | 2/2001 | Christini et al. ............ 280/230 |

* cited by examiner

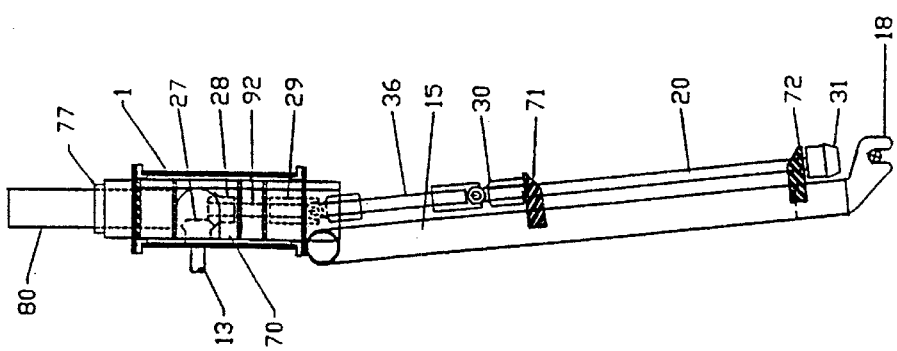

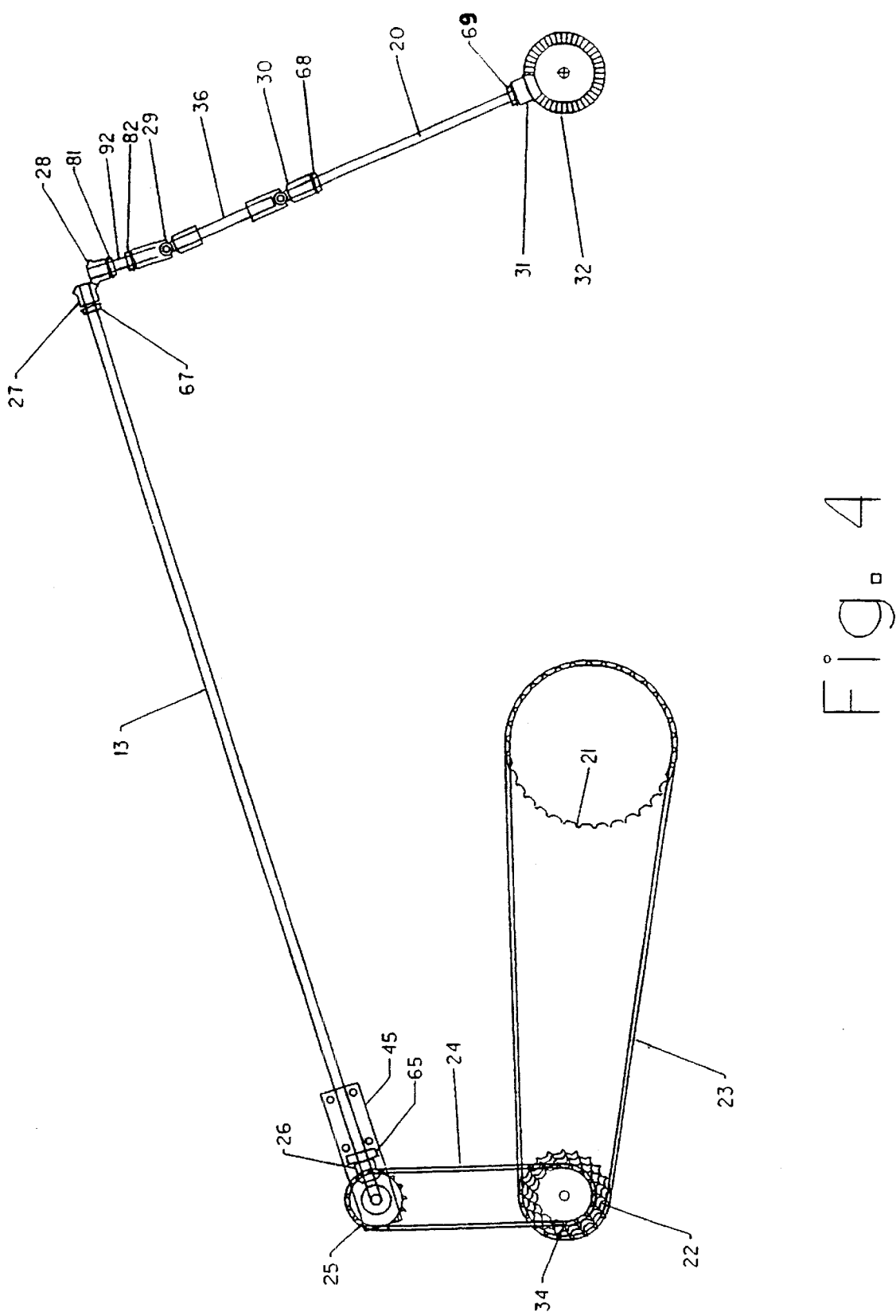

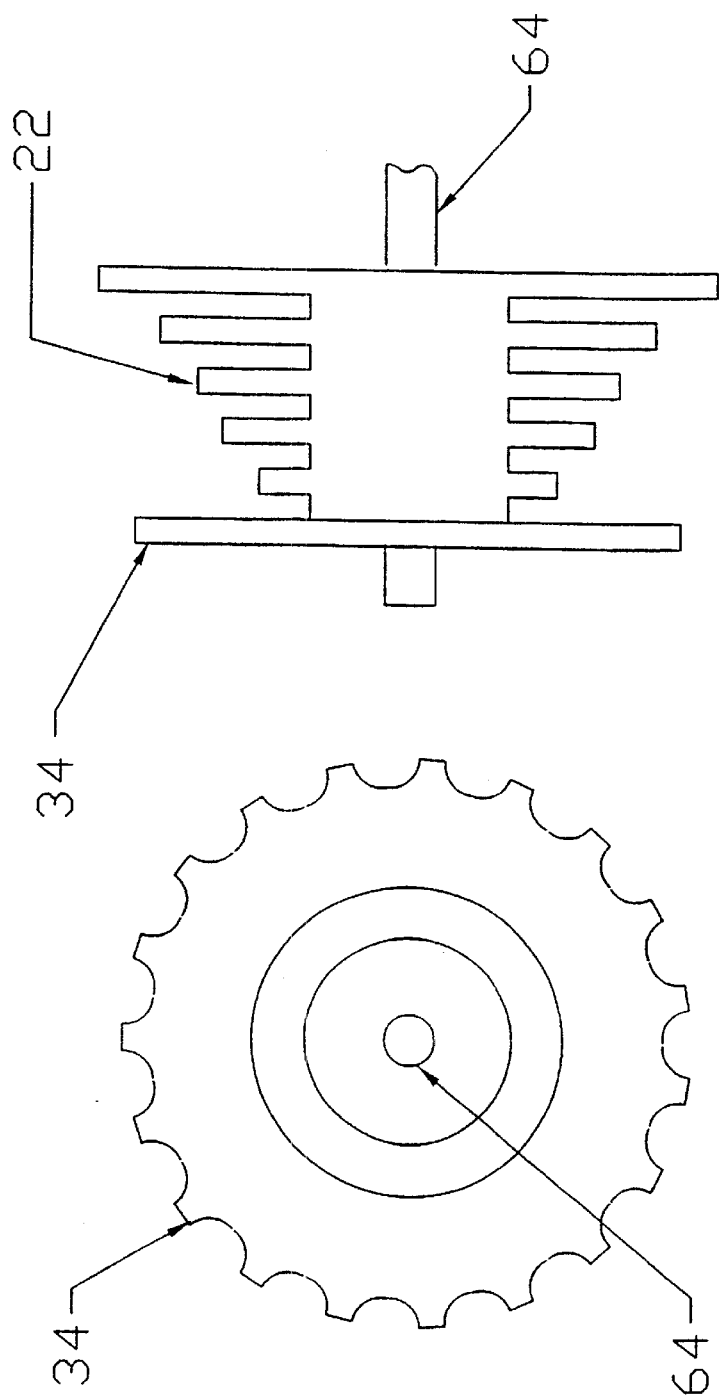

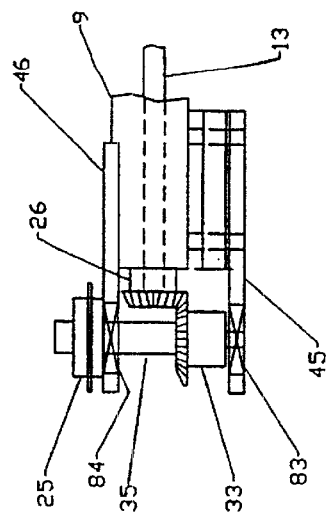
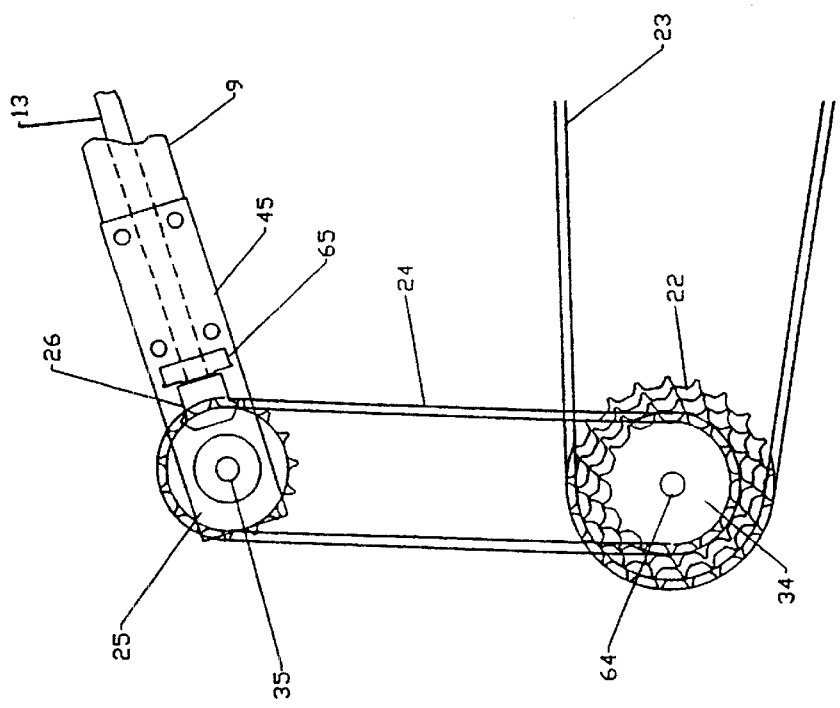

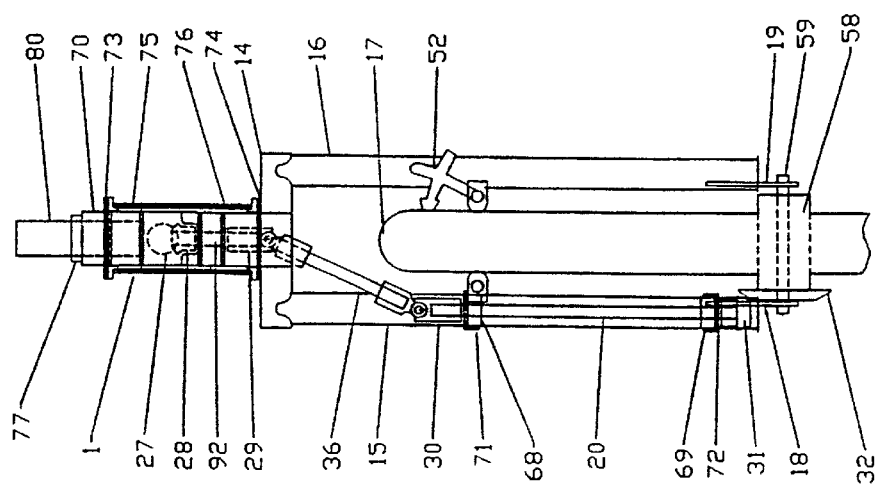

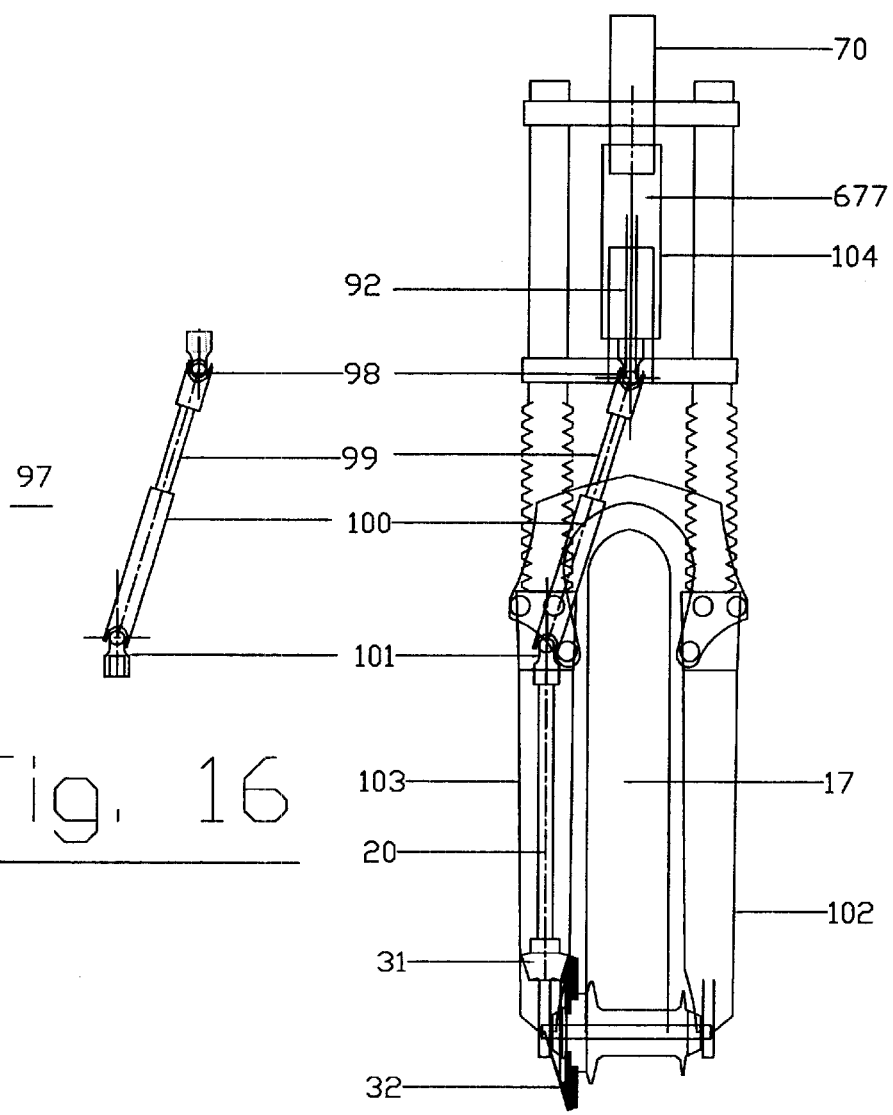

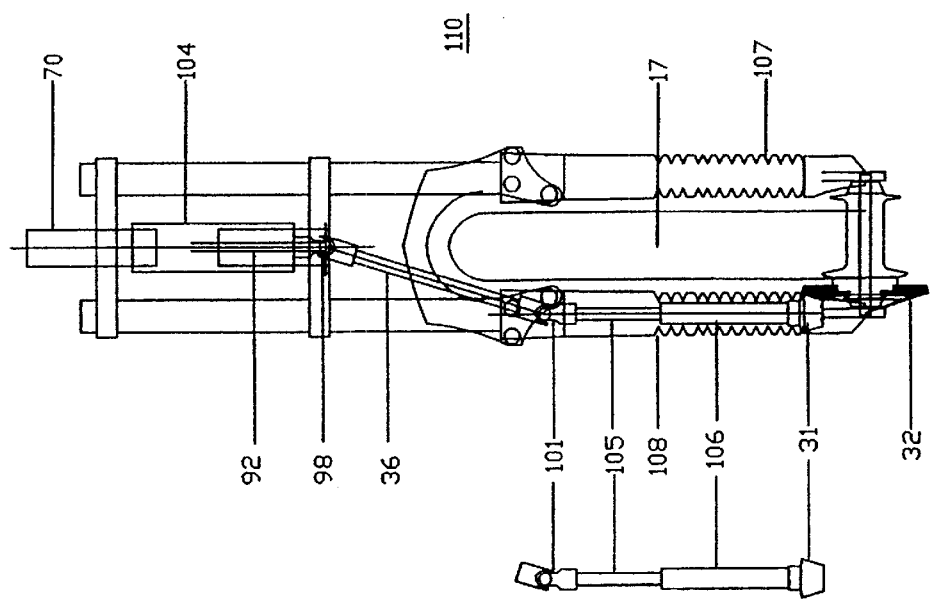

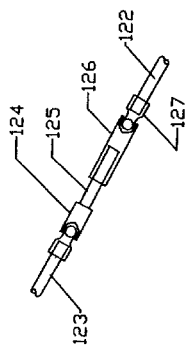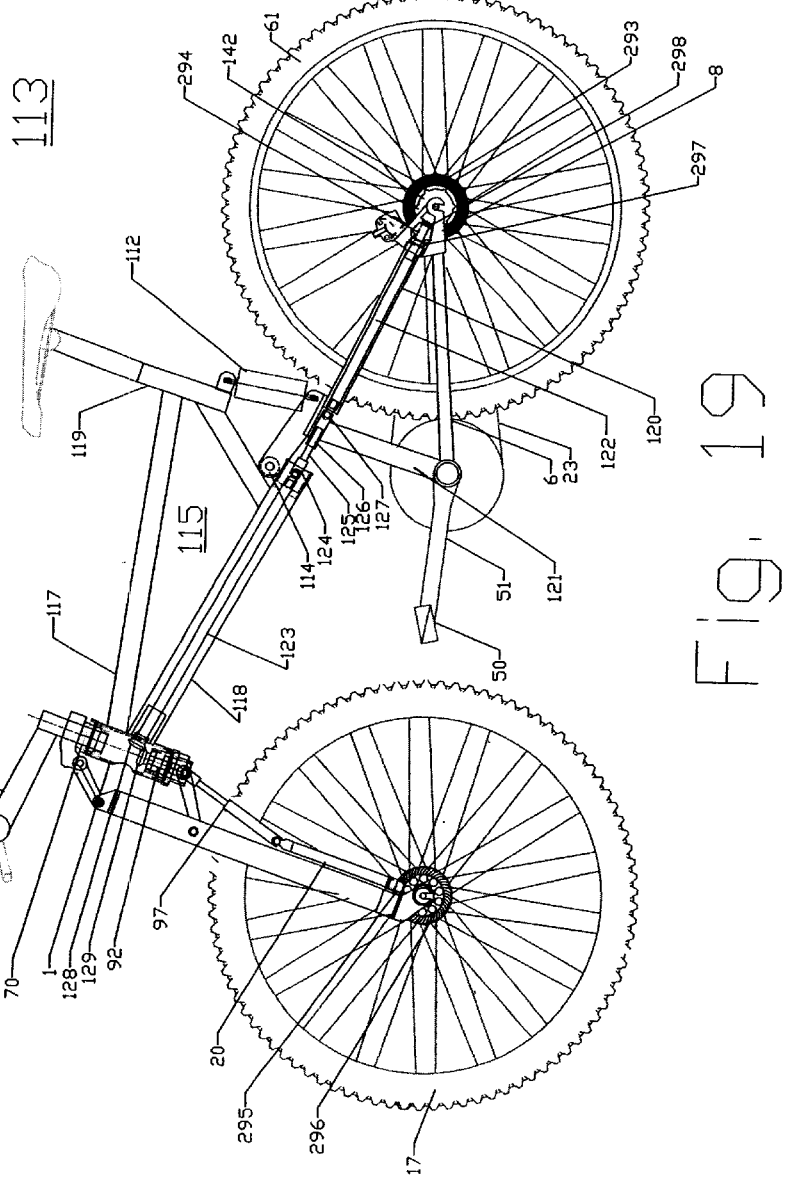

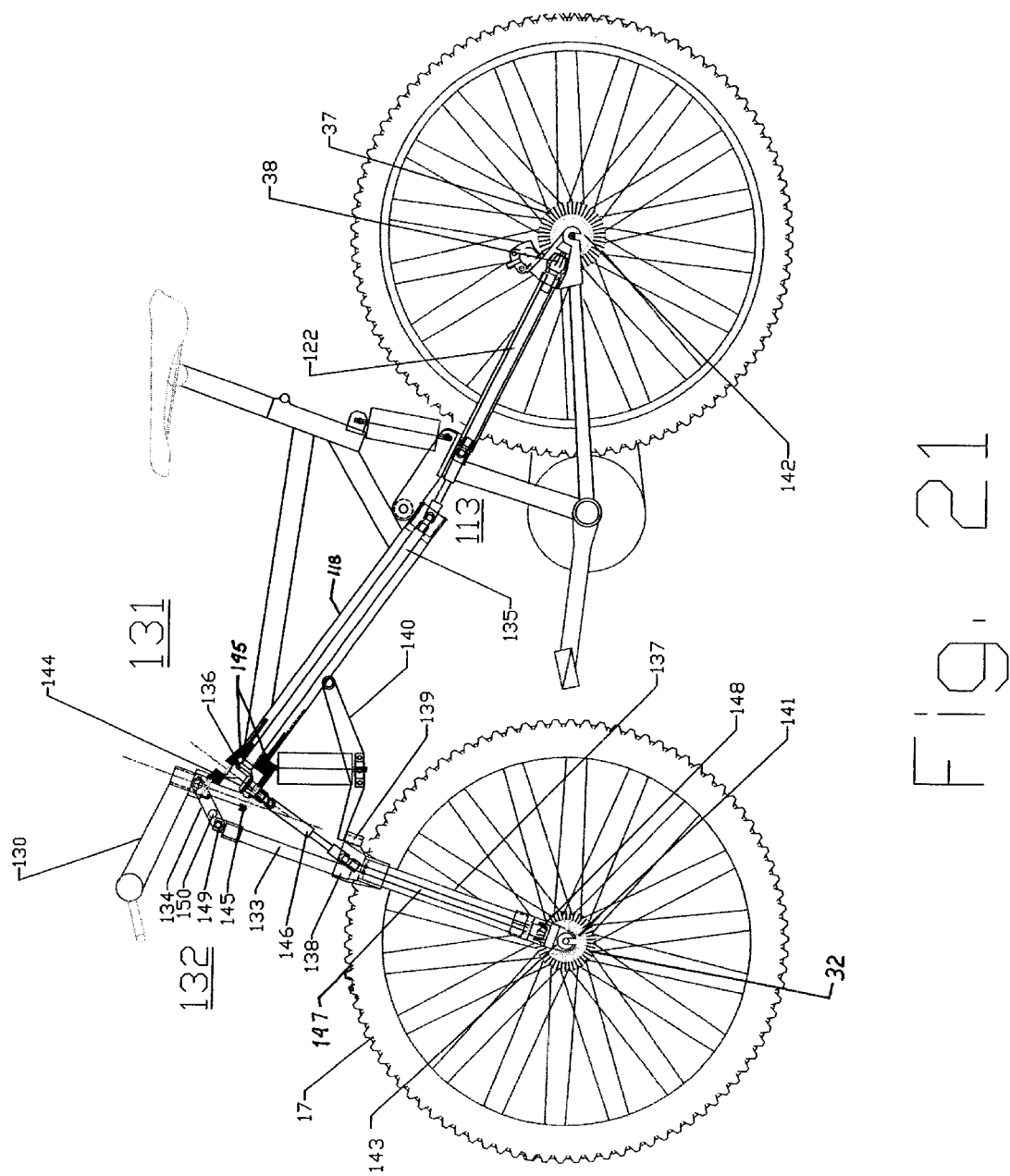

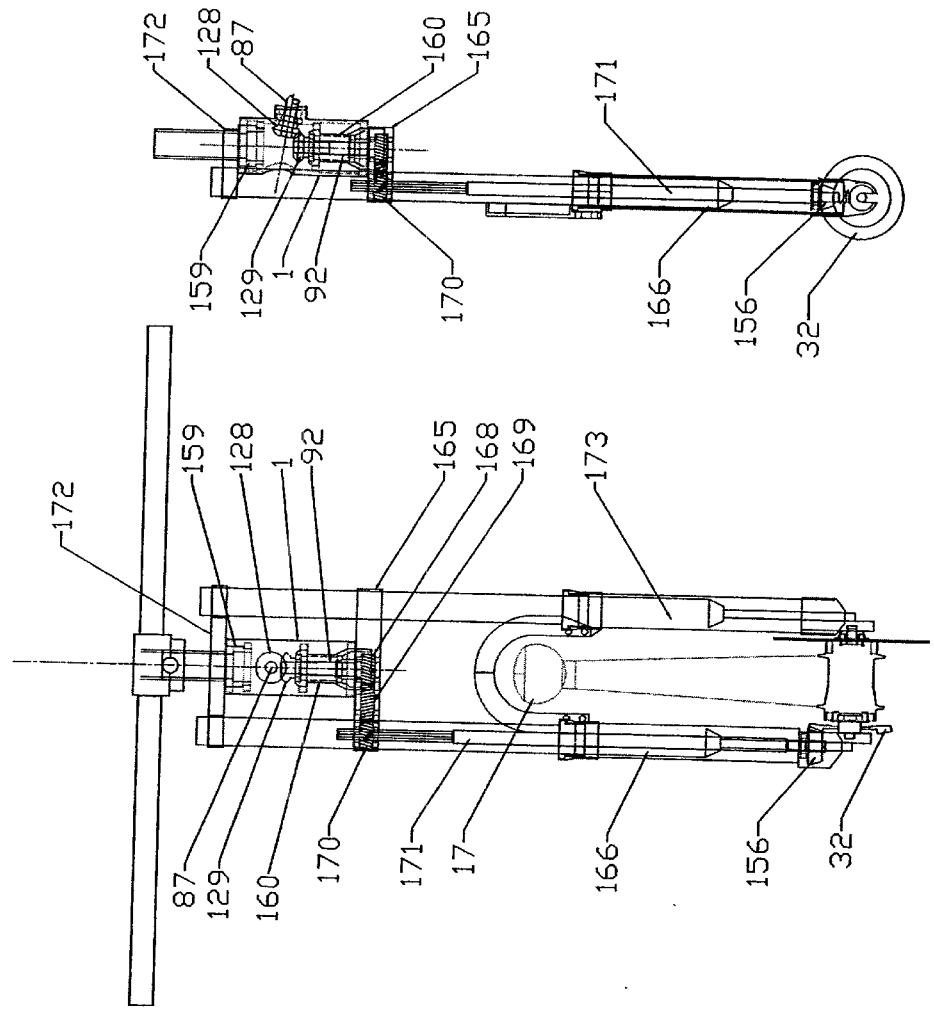
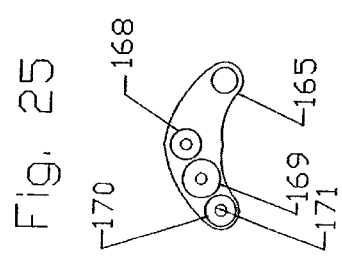

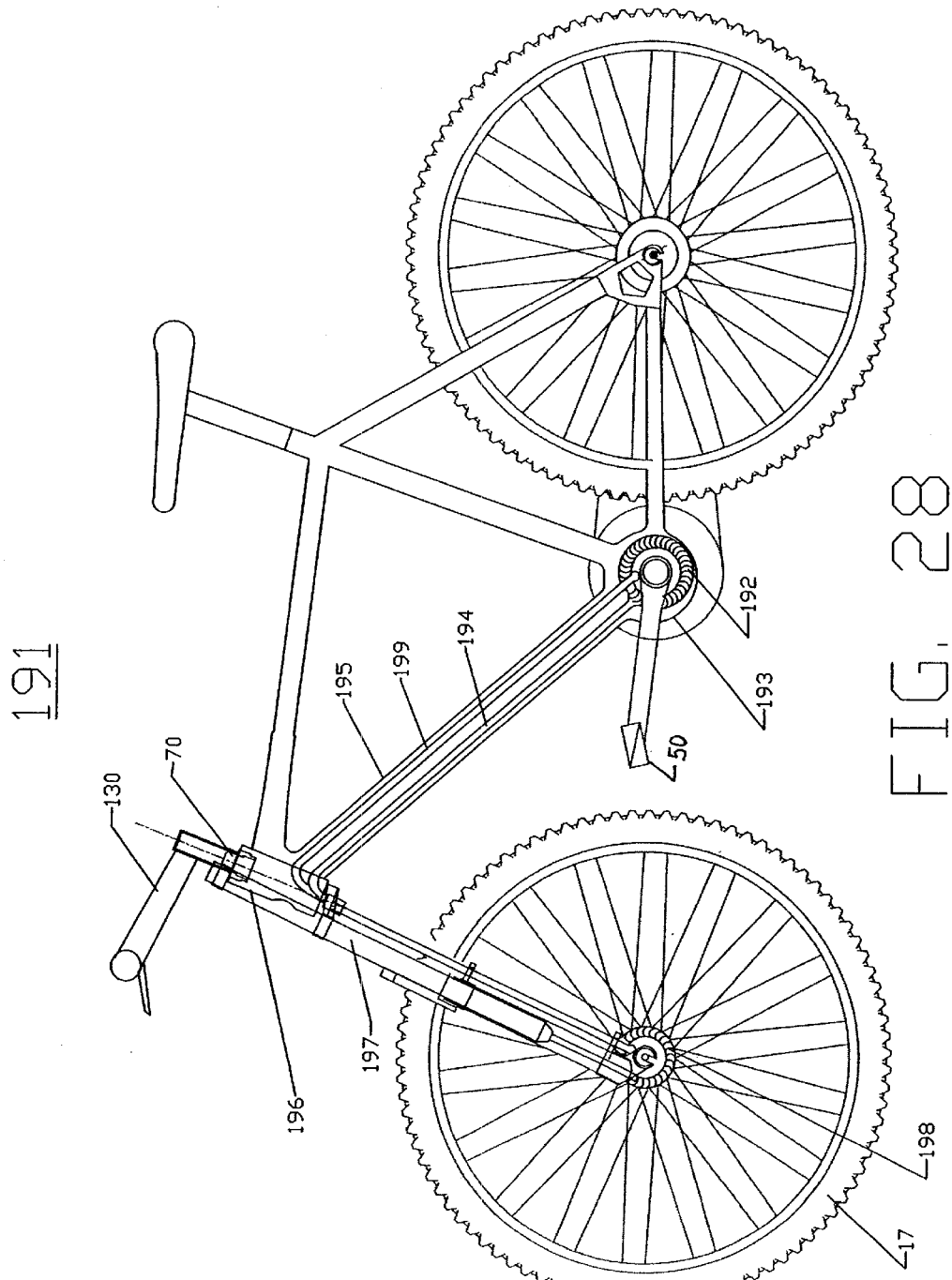

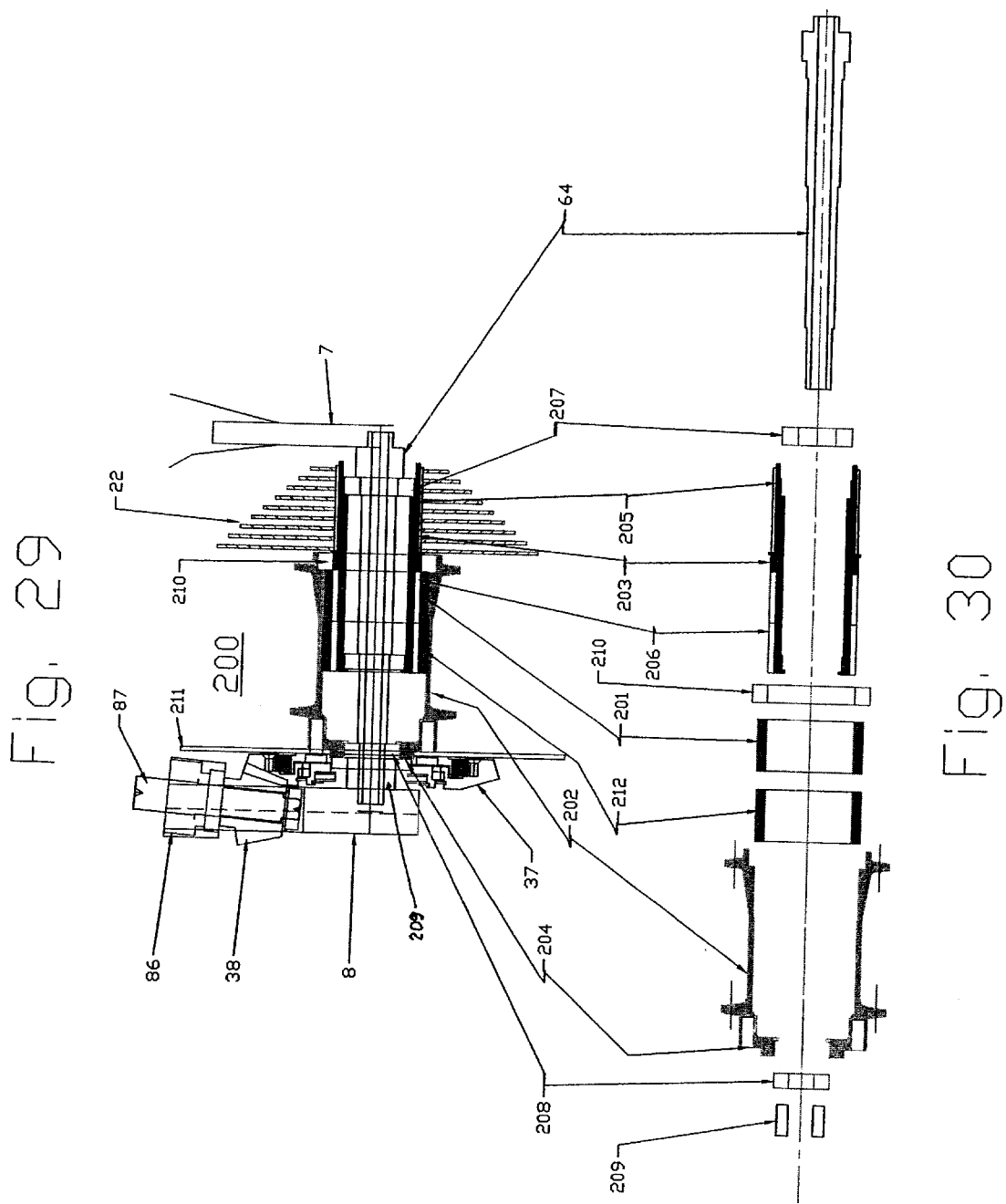

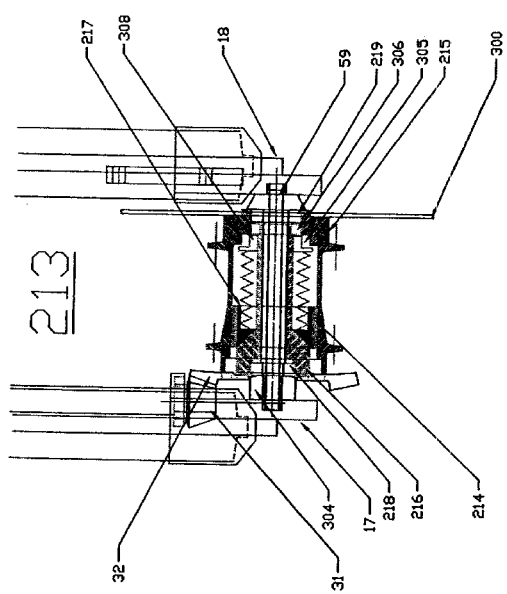
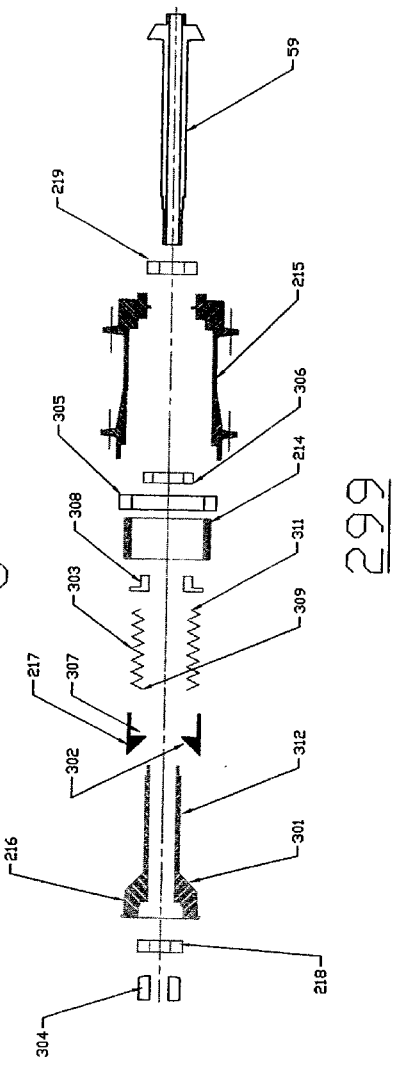

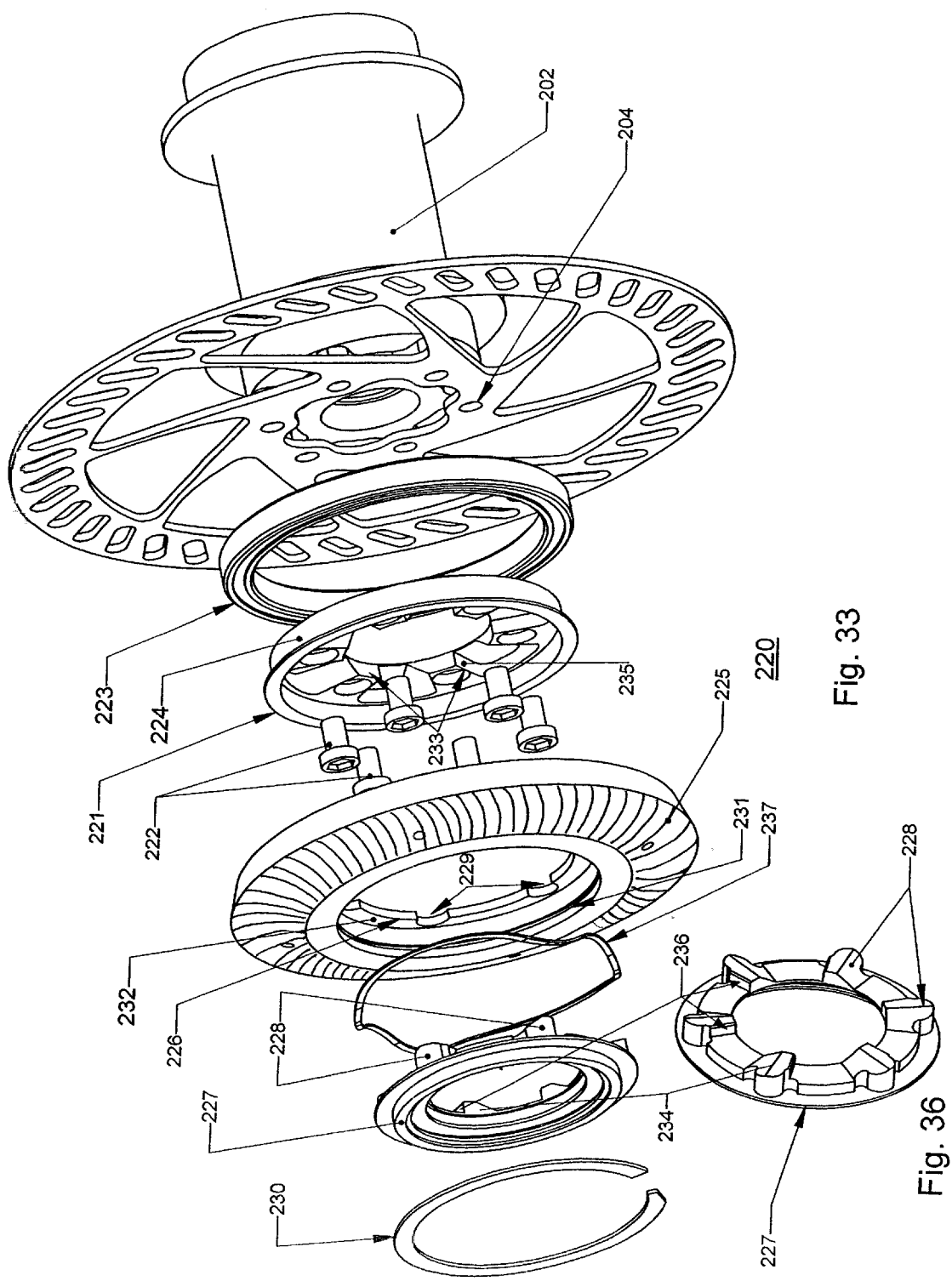

TWO-WHEEL DRIVE TWO-WHEELED VEHICLE

CROSS REFERENCE TO RELATED APPLICATIONS

This is a continuation-in-part of U.S. patent application Ser. No. 09/372,160, which was filed on Aug. 11, 1999 now U.S. Pat. No. 6,182,991 which is a continuation-in-part of application Ser. No. 09/171,742, filed Oct. 23, 1998 now U.S. Pat. No. 6,161,854, which is a 371 of PCT/US97/06181, filed Apr. 25, 1997 and relates to and claims priority to U.S. Provisional Patent Application Ser. No. 60/016,232, which was filed on Apr. 26, 1996 and is entitled Two-wheel Drive Bicycle. In addition, application Ser. No. 09/372,160 relates to and claims priority to U.S. Provisional Patent Application Ser. No. 60/096,264, which was filed on Aug. 12, 1998. The present application also relates to copending U.S. application Ser. No. 09/397,270, filed Sep. 16, 1999.

BACKGROUND OF THE INVENTION

1. Field of the Invention

The present invention relates to a two-wheel drive two-wheel vehicle, and more particularly a two-wheel drive bicycle having the rear wheel driven by the traditional chain or shaft mechanism and the front wheel driven by a series of shafts and gears transferring power from the driven rear wheel to the front wheel.

2. Description of the Related Art

As off road biking has gained broader appeal, the demands that riders place on their bicycles have increased dramatically. Downhill, snow, and endurance races demand the increased traction and mobility of a two-wheel drive bicycle. Conventional bicycles are powered through a chain linking the pedal crankshaft to the rear wheel. Bicyclists are now facing many obstacles where having only rear wheel drive can lead to bicycle damage or personal injury. For professional riders, precious race time is lost avoiding obstacles such as logs, rocks, loose sand, mud, or ice. Traction and climbing ability are severely limited in extreme mountain conditions by only having the rear wheel provide power. In fact, biking professionals teach that only through learning to keep your weight on the rear wheel will beginners ever hope to improve their off-road skills. Accordingly, there is a need in the industry for a two-wheeled drive bicycle which efficiently transfers power from the pedals to the front wheel, provides the rider with increased ability to safely negotiate rough terrain, and which does not detract from the aesthetic qualities and appearances of the bicycle structure itself.

The concept of a two-wheel drive bicycle is not a new one. Several two-wheel drive bicycle systems are patented at present using various combinations of chains, flexible cable shafts, and rocker arms mounted on the handlebars to transfer power either directly from the pedals to the front wheel or from the rear wheel to the front wheel. In general, two-wheel drive bicycles fall into two categories: 1) permanent designs involving drive trains attached to the frame, and 2) retrofit kits which convert existing bicycles to two-wheel drive. The main drawbacks to these systems are: 1) a modification to the standard bicycle in the form of a kit is expensive when considered as an addition to a bicycle purchase, 2) the low strength flexible shaft limits the allowable loading on the system, 3) the retro-fit kit requires considerable skill to attach and cannot be designed to optimally work with every frame design, and 4) the drive mechanisms are often large and openly exposed on the outside of the frame potentially creating additional hazards for the rider and detracting from the overall appearance of the bicycle.

U.S. Pat. No. 4,773,662 shows a bicycle with a front wheel driven by a chain connected to a handle-bar mounted hand pedaling system. The bicycle uses arm power to drive the front wheels and is adaptable to a conventional bicycle frame.

U.S. Pat. No. 5,542,689 shows a front wheel drive system for a bicycle which can be installed on a bicycle to drive the front wheel by rocking the handlebars back and forth. As with U.S. Pat. No. 4,773,662 mentioned previously, this bicycle attempts to harness the energy of the rider's arms as an additional power source for driving the bicycle. However, a drive mechanism requiring the use of the riders arms for more than steering, balance and control of the vehicle would likely create serious safety problems and interfere with the bicycle operation for both professional and recreational mountain bikers.

U.S. Pat. No. 5,052,705 describes a bicycle with power distribution from the rear wheel to the front wheel via a caliper and cable drive system. The drive system is activated by a caliper clamped on the rear wheel connected by a cable to a caliper on the front wheel. Inefficient power transfer to the front wheel due to slippage as well as torque loss in the cable would be a problem with this system.

U.S. Pat. No. 5,224,725 describes one permanent system that has been developed utilizing a series of chains and sprockets. This design involved many moving parts that would make the bicycle very awkward and difficult to maintain. The exposed chain that runs along the top tube would be hazardous to the rider and the front chain also would interfere with steering.

U.S. Pat. No. 5,324,057 describes a bicycle driven with a chain meshed with both the front and rear sprockets through a plurality of gears, pulleys and spring systems to power the front wheel.

Several two-wheel drive bicycles demonstrate a front wheel driven by flexible cables or flexible cables in combination with chains. (See e.g., U.S. Pat. Nos. 5,332,244, 5,253,889, 5,158,314, 5,116,070, and 4,895,385). The systems, such as the bicycle produced by Turner Drive Systems of Rogers, Arkansas, target the market for a drive system which can be retrofit to any standard frame with modifications primarily to the gearing and chain attachments necessary to drive the front wheel.

As disclosed, U.S. Pat. No. 5,332,244 uses chain-sprocket arrangements, along with a flexible shaft to transmit some of the power from a rear gearbox to the front wheel. The retrofit system utilizes the inner most sprocket for the drive system, however the rider can use the other sprockets to shift gears normally. Deformation of the flexible cable, and corresponding loss of efficient power transfer from the rear wheel to the front wheel is a drawback of each of these systems when compared to the rigid shaft drive of the present invention.

U.S. Pat. No. 5,158,314 uses a complex mechanical system to power the front wheel from the powered rear wheel. A first traction chain coupled to the rear wheel and attached to the frame is connected to a series of rigid and flexible shafts which attach to a second traction chain which is mounted above the front wheel and powers the front wheel. U.S. Pat. Nos. 4,029,332 and 4,474,660 also describe two-wheel drive bicycles with complex chain or belt drive and pulley systems.

Bicycle hubs utilizing roller clutch bearings are described in U.S. Pat. Nos. 5,485,905 and 5,662,197. However, neither application discloses the use of the roller clutch hub to provide power transmission advantages for the front wheel drive of a two-wheel drive bicycle nor does either utilize more than a single roller clutch within the hub for added strength and durability of the hub shell.

It is, therefore, the object of this invention to provide a two-wheel drive bicycle with a front wheel that is powered by a rigid shaft front wheel drive and, therefore, does not experience the loss of power due to slippage or elasticity associated with flexible shafts and other drive systems.

It is a further object of this invention to provide a two-wheel drive bicycle wherein the rigid front wheel drive powers the front and rear wheels simultaneously in a ratio which enables safe and effective operation of the bicycle and provides immediate transfer of power from the pedals to the front wheel.

It is a further object of this invention to construct the bicycle frame in a manner that substantially encloses the front wheel drive within the frame and provides effective two-wheel drive biking with no interference of rider motion, with normal braking and steering radius, and with minimal rider danger with respect to moving parts and obstruction of operation.

It is a further object of this invention to provide a front wheel drive that adapts to a variety of common bicycle frame designs including rear suspension, the "double diamond" frame configuration found on most mountain, road, touring commuter, comfort, electric and BMX bicycles, as well as the frame configurations of recumbent and tandem bicycles.

It is a further object of this invention to include an engagement clutch that allows the rider the option to choose between rear-wheel-only and two-wheel drive operation when conditions warrant.

It is a further object of this invention to incorporate the front wheel drive technology into a shock-absorbing front fork and rear suspension system of a bicycle to provide the rider with a smoother ride.

It is a further object of this invention to disclose a free wheeling hub for the front wheel that utilizes a roller clutch bearing, and therefore, does not feature a continual ratcheting sound as the bicycle is being operated in the optional rear-wheel-only drive configuration and the front wheel is free wheeling. Additionally, in one embodiment, the free wheeling hub includes a torque-limiting clutch to prevent failure of the front wheel drive.

It is a further object of this invention to disclose alternative drive systems that can be incorporated into the frame of the bicycle to power the front wheel either from the rear wheel or directly from the pedals and crank tube region of the frame. Alternative front wheel drives include ball-bearing drive, hydraulic, or a combination of internal belts, chains, or cables such that the steering radius is unimpeded and there is no significant power loss in transferring power to the front wheel.

Other objects and advantages will be more fully apparent from the following disclosure and appended claims.

SUMMARY OF THE INVENTION

The present invention is a two-wheel drive bicycle, otherwise known as an all wheel drive bicycle or a bicycle powered by both the rear and the front wheels simultaneously. The two-wheel drive bicycle disclosed herein may include a shock-absorbing front fork or rear suspension system. Additionally, the front wheel drive of the two-wheel drive bicycle is adapted to a number of bicycle frame configurations including double diamond frames found on mountain, road, BMX, electric, commuter, touring, comfort and other common bicycle models as well as adaptation of the front wheel drive to recumbent and tandem bicycles. The front wheel drive as disclosed herein can power the front wheel from gears located at the rear wheel or from gears located at an automatic transmission located within or near the crank tube of the frame. The front wheel drive may include rigid shafts and meshing gears or a number of other drive components and assemblies, including hydraulic and ball bearing drives, that are internalized within the bicycle frame and that minimize power loss when powering the rear wheel without limiting the steering range. A two-wheel drive bicycle provides a rider increased safety and the ability to significantly increase speed during navigation through dangerous stretches of terrain.

The present invention, as described in the first through seventeenth embodiments, has several objectives. A first is to provide a two-wheel drive bicycle using a rigid shaft drive as the main power transfer means to the front wheel. Rigid shafts have the advantage of virtually instantaneous power transfer, whereas flexible shafts usually have from 10 to 20 degrees of rotation displacement when applied with a torque which would lead to a spongy feeling when pedaling the bicycle.

Essentially, the rider could turn the pedal several inches before the front wheel would begin to turn. Additionally, a rigid shaft drive is supported by bearings which results in very low friction in the front wheel drive. Alternatively, a front wheel drive that provides virtually instantaneous power transfer without rotation displacement would be acceptable substitutes for the rigid shafts of the front wheel drive. More specifically, ball bearing drives, hydraulic drives, internalized cables, chains, belts, or a combination thereof, could be utilized. In each such case, the important feature is that the front wheel is instantaneously driven when power is applied to the rear wheel without loss of power, increased drive system friction, or the rider noticing a spongy feeling when transferring power through the front wheel drive.

Secondly, the front wheel drive of the two-wheel drive bicycle is substantially incorporated into the frame. Alternatively, the front wheel drive should be enclosed in a tube which is attached to the frame. The primary reason for enclosing the front wheel drive is to maintain the front wheel drive in a fixed position thereby minimizing or eliminating slippage and, as importantly, enclosing the moving parts to minimize danger to the rider. Enclosing the front wheel drive will also avoid the costly, time consuming and often bulky modifications necessitated in configuring the retrofit two-wheel drive models while also maintaining the general aesthetic appearance of a standard bicycle. Importantly, enclosing the front wheel drive in the frame within, near, or proximate the head tube also places front wheel drive components on the axis of steering to minimize torque reactions from the rotating components. Finally, enclosing the front wheel drive within the frame enables adaptation to numerous common bicycle frame designs including full suspension, "double diamond," touring or comfort bicycles, recumbent, and tandem bicycles.

Third, both the front and back wheel of the two-wheel drive bicycle are designed to accommodate a system of sprockets or bevel gears. The rear wheel transmits torque to the front wheel drive through the shaft either by using a power transfer mechanism at the rear wheel comprising, for example, a bevel gear mounted on the rear drive sprocket set which s directly interacts with the pinion gear on the drive shaft. The power is transferred from the drive shaft to the front wheel by a pinion gear engaging with a bevel gear mounted on the axle of the front wheel. The gears may feature either straight or helical (spiral) gear teeth. Alternatively, the front wheel drive can originate directly from the crank tube area of the frame. In that configuration, a manual or automatic transmission within the crank tube would transfer power to the rear wheel with a direct drive shaft or chain and a second drive shaft would exit the transmission toward the front wheel of the bicycle to provide power to the front wheel.

Fourth, the neck and head tubes of the bicycle frame are designed to accommodate a pair of meshing gears with one being attached to the front end of the main drive shaft and the other being attached to the top end of the front drive shaft which descends to the front wheel. The head and neck tubes, which may be either standard sized or enlarged, are necessary to enable the miter gears to mesh at an angle of 90 degrees or less while enabling an optimum head tube angle relative to the ground for steering responsiveness. Furthermore, the head and neck tubes should be modified to enable an adequate turning radius of the front wheel of approximately 180 degrees.

In the present invention, the neck tube is preferably cut away in the center to accommodate the meshing gears and is then supported within the head tube by attaching at the top and bottom ends to the front fork. The severed neck tube forms an upper neck tube section and a lower neck tube section and is then further supported by bearings within the head tube and attached at each end to the front fork to enable adequate turning radius and front fork strength. In bicycles that do not feature a traditional head and neck tube design, such as the four-bar linkage front suspension disclosed herein, the front wheel drive exits the frame proximate the axis of steering immediately behind the steering mechanism to permit the full steering range while minimizing unwanted torque reactions from the rotating front wheel drive. Finally, where the front wheel drive originates within the crank tube, similar designs enable negotiation through the head and neck tubes.

Fifth, the frame of the bicycle is modified into a split configuration to enable a straight path for the drive shaft from the rear of the bike to the head and neck tubes. However, any frame configuration which substantially incorporates the rigid drive shaft into the frame from the vicinity of the rear wheel to the head tube and down the front fork assembly of the bicycle is envisioned. Incorporating the front wheel drive within the frame enables adaptation of the front wheel drive to numerous common bicycle frame designs including full suspension, "double diamond," comfort, touring, commuter bikes, road, BMX, electric and even recumbent or tandem bicycles. Two-wheel drive versions of recumbent and tandem bicycles would provide the rider added control in wet or loose conditions. An additional advantage for recumbent or tandem bicycles, as disclosed in the invention, is the use of shafts in place of lengthy chains for certain portions of the drive train. Standard recumbent bicycles utilize a lengthy chain from the pedals in the front of the bicycle to the rear wheel which is usually behind the rider. The use of a shaft drive to the front wheel, and then as a substitute for a portion of the lengthy drive chain, will provide the rider a safer ride and result in less broken and skipping chains.

Sixth, the drive shaft descending from the neck of the bicycle to the front axle should be configured to enable both free motion in the steering of the bicycle and free rotation of the front tire as well as no interference with braking. In the embodiments disclosed herein, a pair of universal joints are used to negotiate clearance by the rigid shafts around the front wheel. Alternatives to using standard universal joints with pins include ball spline universal joints or other well-known linkages. An alternative front fork design completely encloses the drive shaft and universal joint within one of the front fork members as shown in the eighth and ninth embodiments. In this configuration, a universal joint could be enclosed within the fork crown, or alternatively, a series of meshing gears within the fork crown could be used to enable adequate clearance for the front wheel drive to avoid interference with the front wheel.

Other mechanisms and gear combinations are also envisioned and the front wheel drive may also contain an adjustable component to enable the compression of the front fork or movement of the rear wheel in a rear-suspension system bicycle. One such alternate combination, as described in the third embodiment, is an expandable universal joint system with a pair of sliding shafts that adjusts with the expansion and compression of a shock-absorbing front fork while maintaining power transmission to the front wheel. Alternatively, as discussed in the fourth, eighth and ninth embodiments, sliding shafts along the fork member or a sliding shaft within one of the meshing gears located within the fork crown could be utilized to accommodate the expansion and contraction of the shock-absorbing front fork instead of a telescoping universal joint. Also, as disclosed in the fifth embodiment, alternate drive components can be used instead of the miter gears for transmitting power from the main drive shaft to the front drive shaft system.

Seventh, the front wheel drive includes an engagement clutch located at the rear wheel to enable the rider to optionally shift the bicycle from rear-wheel-only drive to two-wheel drive. The engagement clutch for the front wheel drive is preferably a cable-activated clutch featuring engaging dog tooth plates that mounts on standard disk brake bicycle hubs. Accordingly, the narrow dimensions and diameter of the clutch are essential to incorporating this feature into the front wheel drive while maintaining the ability to utilize standard bicycle components and frame spacing.

Eighth, free wheeling or one-way front and rear hubs utilizing roller clutches are disclosed. The roller clutch has the added advantages of being both silent in its operation and virtually instantaneous in engaging as the one-way hub reverses from its free-wheeling direction to the engaged direction. The free wheeling hub disclosed herein also features a torque limiting clutch to prevent front wheel drive failure upon the transfer of severe torque loads through the drive system.

Ninth, a torque limiting clutch is disclosed that enables the front wheel drive to rotate independently from the front wheel when extreme torque loads are transmitted to the front wheel. Accordingly, torque loads that may cause failure to the front wheel drive can be relieved by the torque limiting clutch without damage to the front wheel drive.

Thus, according to the broad aspects of the invention, the two-wheel drive bicycle comprises:

(a) a rigid front wheel drive that transmits power from the rear wheel to the front wheel, or from the crank tube to the front wheel, through a series of rigid drive shafts including a main drive shaft and a front drive shaft and a series of meshing gears or, alternatively, through other front wheel drive configurations such as ball bearing and hydraulics that would efficiently and instantaneously transmit power to the front wheel with minimal power loss due to drive system friction and without a "spongy" pedaling sensation;

(b) a frame constructed of tubing, including sections which enclose the front wheel drive system and which is integral with or a part of the bicycle frame;

(c) a neck tube and a head tube designed to accommodate the drive shaft system in a manner that maintains optimum head angle and permits an adequate turning radius;

(e) a front drive shaft system descending to the front wheel configured to enable both free motion in the steering of the bicycle and free rotation of the front wheel without interfering with braking or tire rotation;

(f) a shock-absorbing front fork and a rear suspension system that incorporate the front wheel drive to ensure a smoother ride;

(g) An engagement clutch to provide the rider the option of shifting the bicycle from two-wheel drive to rear wheel-only drive;

(h) A one-way hub utilizing a roller clutch for silent rotation and resulting in minimal backlash in both the front and rear wheels;

(i) A torque-limiting clutch to enable release of extreme torque loads within the front drive prior to failure.

In summary, in the present invention, the power is transferred from the pedals to the front wheel through a rigid front wheel drive shaft system including a series of meshing gears. The frame of the bicycle is designed to contain the front wheel drive system that transmits power to the front wheel. In order to have a straight path from the rear wheel to the neck tube, the main frame tube is split into two tubes that run directly from the neck to a gear mounted on the rear wheel. Alternative frame configurations are possible through the utilization of universal joints, ball spline universal joints, or other front wheel drive pivot points at certain points in the frame. The front wheel drive system may also originate from within the crank tube of the bicycle frame directly to the front wheel.

The power is transmitted from the rear wheel wherein the drive gear at the end of the drive shaft meshes with a bevel gear mounted circumferentially on the rear drive gears. At the front end, the main drive shaft connects to a gear that is located inside the front head tube of the bicycle and meshes with a second gear. The neck and head tube are standard-sized or, alternatively, enlarged in comparison to a standard bicycle to allow for full steering capabilities of the bicycle while transferring power to the front wheel. The gears as shown are connected to one or more standard universal joints or ball spline universal joints that are then connected to a front rigid drive shaft system. The purpose of this configuration is to allow the rigid front shaft system to negotiate around the front tire and to allow free motion of the wheel for both rotation and steering. Alternative configurations which would ensure that the front drive shaft does not interfere with steering or rotation of the front wheel are also anticipated. One such alternative would reduce the number of components to a single front drive shaft angled from the head tube to the front hub. Another such alternative would utilize a single piece composed of a pair of interconnected universal joints of appropriate length with the miter gear at one end and the front drive shaft at the other end. Additionally, a series of meshing gears completely contained within the fork crown could be utilized. In addition, alternate drive components can be used instead of the miter gears for transmitting power from the main drive shaft to the front drive shaft system. Those skilled in the art will recognize other methods for constructing a front drive shaft system which does not interfere with the front wheel, and the embodiments disclosed herein are not to be construed as limiting.

The front drive shaft transmits power to the front wheel through the interface of a pinion gear attached to the lower end of the front shaft and a bevel gear mounted circumferentially on the front wheel hub. The front wheel hub should be a one-way hub which catches in one direction but freewheels in the other direction to enable the rider to coast without the pedals turning. The front wheel hub could utilize a roller clutch to enable one-way freewheeling. Roller clutches have the added advantage of silent operation and nearly instantaneous engagement. While virtually all ratcheting hubs feature some degree of backlash as the ratchet engages, the roller clutch engages virtually as soon as the rotational direction of the hub changes. This feature is important for the front wheel drive so that any power transferred through the front wheel drive will result in instantaneous front wheel traction whereas the use of a ratcheting front hub would result in some degree of rotational backlash in the front hub before the front wheel would engage and become powered by the front wheel drive. Additionally, the use of at least two roller clutches within a single rear hub would provide additional strength in the system by spreading the torque forces over a larger surface within the hub shell.

As disclosed, a shock-absorbing front fork is incorporated into the bicycle design of the present invention. The expandable universal joint system includes a middle section with an inner sliding shaft and an outer sliding shaft that increases and decreases the distance between the universal joints as the shock-absorbing front fork expands and shortens in length. Additionally, the shock-absorbing front fork is connected to a neck tube that incorporates the features as disclosed herein, including but not limited to a cutout section or completely severed neck tube which enables rotation around the meshing gears providing adequate steering rotation. Alternative front fork designs include the use of ball spline universal joints in the place of standard pin universal joints and the complete integration of the front wheel drive within the front fork crown and fork members. Those skilled in the art will recognize other methods for constructing and mounting a shock-absorbing front fork onto the bicycle frame in a manner which does not interfere with steering or rotation of the front wheel while enabling the front drive shaft system to expand and to contract with the expansion and contraction of the shock-absorbing front fork.

In general, the disclosed front wheel drive assembly could be utilized similarly in any two-wheel drive two-wheeled vehicle including motorcycles, mopeds, and pedal assist vehicles. The relevant concepts for a two-wheel drive motorcycle would involve the transfer of the power from the rear wheel (as in the second and sixth embodiments) or the center drive transmission (as in the eleventh embodiment) through a rigid drive system, internal to the motorcycle frame to enable a full range of steering and instantaneous power transfer to the front wheel. Furthermore, front wheel drive components located symmetrically and along the axis of steering are important to controlling torque reactions. Like a two-wheel drive bicycle, the two-wheel drive motorcycle would have increased traction and mobility of the front wheel, especially during uphill climbs and downhill cornering on loose or slippery material. The shock-absorbing front fork and rear suspension ensures a smoother ride and greater contact of the front wheel with the terrain for all-around improved rider experience. The invention discloses a method of manufacturing a functional two-wheel drive two-wheeled vehicle with all the disclosed embodiments. As envisioned, this fully integrated front wheel drive would not only compete with the most advanced two-wheeled vehicles on the market but would also create an entirely new category in numerous industries.

BRIEF DESCRIPTION OF THE DRAWINGS IN ACCORDANCE WITH THE PRESENT INVENTION

FIG. 3 is a side view of the front fork assembly with a cut away of the head tube revealing the neck tube and other head tube components.

FIG. 4 is a view of the first embodiment of the bicycle drive system.

FIG. 5 is a view of the modified drive sprocket.

FIG. 6 is a view of the modified rear sprocket assembly for the first embodiment.

FIG. 7 is a view of the first embodiment of the rear drive assembly.

FIG. 8 is a view of the first embodiment of the rear drive assembly.

FIG. 9 is a front view of the front fork assembly.

FIG. 15 is a front view of the shock-absorbing front fork with the expandable universal joint system.

FIG. 16 is a view of the expandable universal joint system.

FIG. 17 is a front view of a shock-absorbing front fork with expandable fork members and an expanding straight drive shaft system.

FIG. 18 is a view of the expanding straight drive shaft system.

FIG. 19 is a side view of a full suspension mountain bike incorporating the front wheel drive into the frame and utilizing a telescoping ball spline universal joint system in the front wheel drive.

FIG. 20 is a side view of the telescoping ball spline universal joint system.

FIG. 21 is a side view of a two-wheel drive full suspension mountain bike featuring a four-bar linkage front suspension system with an adjustable rake feature.

FIG. 23 is a side view of a dual crown shock-absorbing front fork for a two-wheel drive bicycle that entirely encloses the front wheel drive.

FIG. 24 is a front view of a double crown shock-absorbing front fork entirely enclosing the front wheel drive that includes a series of meshing gears.

FIG. 25 is a top view of the series of meshing gears enclosed within the double crown shock-absorbing front fork.

FIG. 28 shows a side view of a double diamond bicycle frame illustrating a hydraulic front wheel drive within the frame to power the front wheel.

FIG. 29 is a rear view of the one-way rear hub with a roller clutch and including an engagement clutch in the front wheel drive system positioned between the rear hub and the rear dropout of the frame.

FIG. 30 is an exploded view of the one-way rear hub with a roller clutch.

FIG. 31 is a front view of a one-way front hub with a roller clutch for a two-wheel drive bicycle.

FIG. 32 is an exploded view of a one-way front hub with a front roller clutch and including a torque-limiting clutch.

FIG. 33 is an exploded view of the engagement clutch for the front wheel drive of the two-wheel drive bicycle.

FIG. 36 is a perspective view of an outer clutch plate of the engagement clutch of FIG. 33.

DETAILED DESCRIPTION

First Embodiment of the Invention

Figure 12:
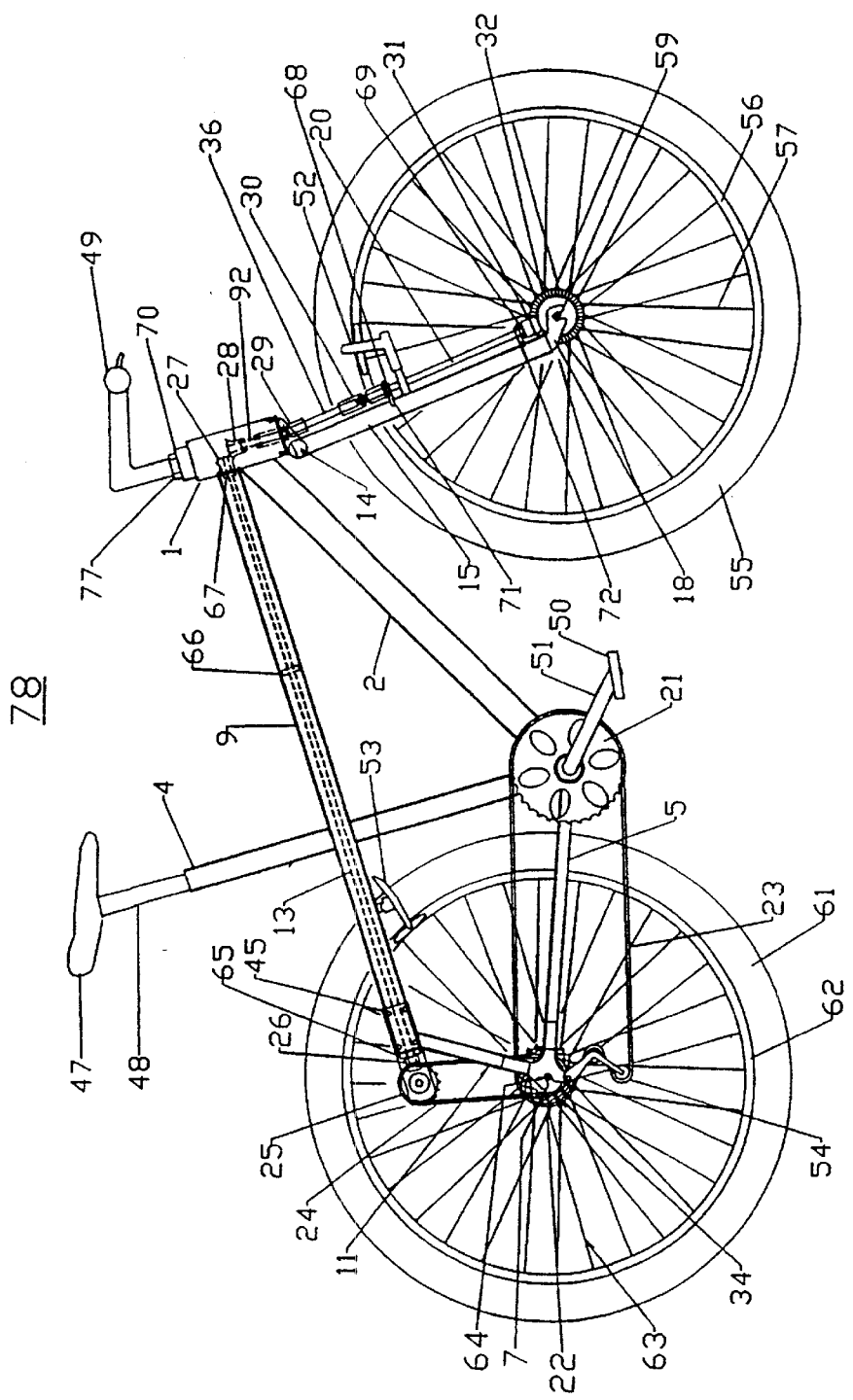
FIG. 12 is a view of the two-wheel drive bicycle as described in the first embodiment.

As shown in FIG. 12, the present invention comprises a two-wheel drive bicycle 78 having many of the same standard bicycle components such as seat 47, seat stem 48, handlebars 49, a right pedal 50, a left pedal (not shown), a pedal crank shaft 51, a front brake 52, a back brake 53, and a derailleur 54 which are not modified in this invention and which are well known in the art. Additionally, the front wheel 17 when used in this description includes the front tire 55, front wheel rim 56, front spokes 57, and front wheel hub 58, all of which are well known to one skilled in the art. Similarly, the rear wheel 90, when used in this specification includes the rear tire 61, the rear wheel rim 62, the rear spokes 63, the rear wheel hub 89, and the rear drive sprockets 22, all of which are well known to one skilled in the art.

Referring now to the drawings of the frame, FIGS. 1, 2, 3, 9, and 12 show the frame design of the first embodiment of the two-wheel drive bicycle 78. The frame 91 comprises a single head tube 1, connecting a single down tube 2, which connects at the crank tube 3, with the seat tube 4, a right chain stay 5, a left chain stay 6 which then terminate with a right rear dropout 7 and a left rear dropout 8, respectively. The main drive tube 9 and the main frame tube 10 form a dual horizontal tube construction beginning at the head tube 1 at the front of the frame 91 and extending rearward where the main drive tube 9 connects to a right rear support tube 11 and the main frame tube connects to a left rear support tube 12. The right rear support tube 11 connects the rear end of the main drive tube 9 with the right chain stay 5 at the right rear drop out 7 and the left rear support tube 12 connects the rear end of the main frame tube 10 with the left chain stay 6 at the left rear drop out 8. As is well known in the art, the rear wheel 90 is mounted rotationally on the rear axle 64 between the right rear dropout 7 and the left rear dropout 8.

As shown in FIG. 12, the main drive tube 9 contains the main drive shaft 13 of the two-wheel drive bicycle 78. The main drive shaft 13 is supported within the main drive tube 9 by a rear drive shaft roller bearing 65, a center drive shaft roller bearing 66, and a front drive shaft roller bearing 67 to ensure smooth rotation and minimize wobble. As is well known in the art, the main drive tube 9 could be custom designed to accommodate various size main drive shaft and bearing combinations.

The frame 91 configuration of the two-wheel drive bicycle 78 includes two notable changes when compared to the standard diamond shaped bicycle frame. First, the head tube 1 is significantly enlarged in order to house the first miter gear 27 and the second miter gear 28. A standard bicycle head tube is usually only 1 to 1.25 inches (25.4 to 31.75 mm) in diameter. The head tube 1 of the bicycle 78 utilizes a 2 inch (50.8 mm) diameter tube. The second modification is the use of a pair of horizontal tubes, the main drive tube 9 and the main frame tube 10 on the right and left sides of the bicycle 78 respectively, which are also mounted lower on the seat tube 4 than a single horizontal frame tube would be on a standard bicycle frame.

The main considerations for the design of the head tube 1 and the positioning of the main drive tube 9 and the main frame tube 10 is the effective transfer of power from the rear drive sprockets 22 through the main drive tube 9, through the head tube 1, and down to the front bevel gear 32 to drive the front wheel 17 in an effective manner which will not interfere with steering, pedaling or tire clearance and result in an appropriate front fork assembly angle necessary for rider safety and control. The wheel base of the bicycle 78, measured as the distance between the front axle 59 and rear axle 64, is 39 inches (0.99 m). The clearance measurement, determined as the height of an obstacle that the bicycle will be able to ride over without it striking the crank tube 3, is 9 inches (0.23 m) and is comparable to other bicycles for off road use. Finally, for optimal control, a safe head tube and front fork assembly angle for a mountain bike is between 70 and 74 degrees. As shown, the angle of the head tube 1 is 71 degrees which was accomplished by raising the main drive tube 9 and main frame tube 10 approximately 7 inches (177.8 mm), or the length of the right rear support tube 11 and the left rear support tube 12, respectively. Other longer or shorter wheel base clearance dimensions or head tube angles may be appropriate for a two-wheel drive bicycle and are well known to those skilled in the art. An alternative design for achieving optimum angle of the head tube 1 is disclosed in the second embodiment of the two-wheel drive bicycle 79.

Though, the frame 91 design represents a key element of the subject invention the drawings presented are not intended to be limiting. While a split frame is demonstrated, any frame design which incorporates the drive train internally from the vicinity of the rear wheel 90 to the forward head tube 1 position of the bicycle then down to the front wheel 17 is envisioned. This structure could take the form of a single tube frame provided the right shaft configuration is designed incorporating the appropriate gears and joints to facilitate the positioning of the drive shaft in the center of the bicycle as compared to being offset on the side of the frame.

FIGS. 3 and 9 illustrate aspects of the bicycle 78 design which encompass the front fork assembly descending from the head tube 1. The front fork assembly begins with a neck tube 70 located within the head tube 1 and connecting at one end with a front fork post support 14. The front fork post support 14 connects with the upper ends of the right front fork member 15 and the left front fork member 16 which pass along the sides of the front tire 17. The right front fork member 15 terminates at the right front dropout 18 and the left front fork member 16 terminates at the left front dropout 19. The front wheel 17 mounts rotationally on the front axle 59 between the right front dropout 17 and left front dropout 18. The right fork member 15 holds the front drive shaft 20 in the present embodiment 78. The front brakes 52 are mounted on the right front fork member 15 and the left front fork member 16 as is well known in the art.

The precision design of the front fork assembly is critical for proper power transmission from the main drive shaft 13 to the front wheel 17 while allowing for a turning radius which gives the rider full steering capabilities and allows for complete control of the bicycle. Rotationally mounted with the head tube 1 and connecting at the lower end with the front fork post support 14, is a neck tube 70. The neck tube 70 is constructed of 1.75 inch diameter tubing (though other diameter tubing could be used) and contains a cutout portion to enable pivoting around the internal drive shaft system components including a first miter gear 27 and a second miter gear during steering of the bicycle 78. As shown in FIG. 4, the neck tube 70 also contains an upper neck roller bearing 81 and a lower neck roller bearing 82 to hold the short connecting drive shaft 92 in place within the neck tube 70 for smooth rotation. Similarly, an upper fork roller bearing 68 and a lower fork roller bearing 69 mounted on the right front fork member 15 support the drive shaft 20 and permit smooth rotation.

The rear drive shaft roller bearing 65, the center drive shaft roller bearing 66, and the front drive shaft roller bearing 67 are pressure fitted to remain fixed in place. The upper neck roller bearing 81 and lower neck roller bearing 82 are held in place by washers welded within the neck tube 70. The upper fork roller bearing 68 is fixed to the right front fork member 15 by an upper fork bracket 71 and the lower fork roller bearing 69 is fixed to the right front fork member 15 by a lower fork bracket 72. As is well known in the art, alternative frame designs and embodiments could utilize other means for securing roller bearings in place and the means described are not to be construed as limiting. As is well known in the art, alternative shaft, tube and fork designs could eliminate or reduce the number of necessary roller bearings. Additionally, those skilled in the art would understand configurations of the front fork assembly which could hold the front drive shaft 20 on the left front fork member 16 and the design shown is not to be construed as limiting.

As shown in FIG. 9, the neck tube 70 is supported within the head tube 1 with means which are well known in the art as being standard on most bicycles. In order to ensure smooth turning of the neck tube 70 an upper head needle bearing 73 and a lower head needle bearing 74 at either end of the head tube 1 encircle the neck tube 70 and support axial loads of the front fork assembly. Additionally, inside the head tube 1, an upper neck needle bearing 75 and a lower neck needle bearing 76 support the neck tube 70 and keep it from pivoting, thus supporting radial loads. This assembly is tightened up by means of a large nut 77 that is threaded on the steering handle tube 80 at the top of the neck tube 70.

As shown in FIG. 3, the neck tube 70 is designed to stay enclosed within the head tube 1. Additionally, the neck tube 70 has a cutout section to allow clearance during rotation of the neck tube 70 corresponding to the steering of the handlebars 49 around the first miter gear 27 and the second miter gear 28. In the two-wheel drive bicycle 78, the cutout is 1.25 inches wide and results in a steering radius of 180 degrees. Alternative designs and dimensions for cutouts in the neck tube 70 resulting in varying steering radiuses are anticipated and the dimensions disclosed should not be construed as limiting.

FIGS. 4 and 12 represent the first embodiment of the shaft drive system. In a conventional manner, power from the pedals is transmitted directly from the front drive sprocket 21 mounted on the pedal crank shaft 51 to the rear drive sprockets 22 via a chain 23. The rear drive sprockets 22 are mounted on the rear wheel 90 at the rear wheel hub 89 which is rotationally mounted on the rear axle 64 between the right rear dropout 7 and left rear dropout 8. As shown in FIGS. 6 and 7, a modified drive sprocket 34 is mounted concentrically on the outside of the rear sprockets 22. The modified drive sprocket 34 replaces two of a standard bicycle's 7 rear sprocket gears on the two-wheel drive bicycle 78. However, the number of gears is not an essential aspect of the present invention and is not to be construed as limiting.

As shown in FIG. 7, power is transferred from the modified drive sprocket 34 through a second drive chain 24 to a second drive sprocket 25. A rear bevel gear 33 is affixed to the second drive sprocket 25 via a short axle 35 and transmits power through its interface with a rear pinion gear 26 fixed directly to the rear end of the main drive shaft 13. The second drive sprocket 25 is fixed proximal to the second rear drive system bracket 46 on the short axle 35 and the rear bevel gear 33 is fixed proximal to the first rear drive system bracket 45 on the short axle 35. The first rear drive system bracket 45 and the second rear drive system bracket 46 are constructed of 6061 reinforced plate aluminum and are fixed permanently via bolts and welding directly to the main drive tube 9. The first rear drive system bracket 45 and the second rear drive system bracket 46 are intended to hold the short axle 35 and the second drive sprocket 25 and the rear bevel gear 33 in a fixed position relative to the frame 91 while enabling them to rotate in unison for power transmission. As disclosed, the modified drive sprocket 34 is a 19 tooth sprocket and the second drive sprocket 25 is a 13 tooth sprocket, however, the number of sprocket teeth on any gear should not be construed as limiting as other sprocket teeth configurations are clearly envisioned.

On the two-wheel drive bicycle 78, the meshing and rotation of the rear bevel gear 33 with the rear pinion gear 26 produces a reaction force laterally along the short axle 35, therefore, a first short axle roller bearing 83 and a second short axle roller bearing 84 were used to support this loading. This design is conservative to prevent gear displacement and is not considered limiting as those skilled in the art may clearly envision alternative and less bulky bracket and bearing designs for the rear drive system.

As shown in FIGS. 4 and 12 the rotation of the main drive shaft 13 transmits power through the first miter gear 27 fixed on the front end of said main drive shaft 13 to the second miter gear 28. The first miter gear 27 is mated to the second miter gear 28 at an approximate 90 degree angle within the head tube 1 of the bicycle 78. The power is then transferred from the second miter gear 28 through a short connecting shaft 92, a first universal joint 29, a second short shaft 36, a second universal joint 30, a front drive shaft 20 to a front pinion gear 31 mounted on the lower end of the front drive shaft 20. The front pinion gear 31 meshes with, and transfers power to, a front bevel gear 32 mounted concentrically on the front wheel hub 58. The front wheel 17 is mounted rotationally to the frame 91 on the front axle 59 between the right front dropout 18 and the left front dropout 19 and is driven by the rotational power of the front wheel hub 58.

The front wheel hub 58 is a modified freewheeling hub. Said front wheel hub 58 will catch to transmit power in one direction, but spin freely in the other direction meaning the rider can ride without the pedals turning. Such a hub is standard on rear wheels of bicycles but is necessary on the front wheel of the two-wheel drive bicycle to allow the front wheel to turn while coasting.

As shown in FIG. 9, the first universal joint 29 and second universal joint 30 allow for power transmission down and around the front wheel 17 without interfering with normal steering or rotation of the front wheel 17 and, accordingly, are mounted at a 25 degree offset. Any angles which are within manufacturer's specifications are clearly anticipated for the purpose of transmitting power through the first universal joint 29 and second universal joint 30 down and around the front wheel 17.

Generally, the rear pinion gear 26, the front pinion gear 31, the first miter gear 27 and the second miter gear 28 are attached to shaft ends using setscrews and keyways (not shown) and the first universal joint 29 and second universal joint 30 are attached to shaft ends by shear pins (not shown). Use of setscrews and shear pins is appropriate because if the drive system did undergo a shock load, the failure of a shear pin or keyway would insure that there would be no severe damage incurred in any of the other drive system components, which would be more expensive to replace. Alternative connective means for attaching the pinion gears and universal joints to the corresponding shafts are well know by those skilled in the art.

For a two-wheel drive bicycle, gear ratios underlying the front to back wheel rotation ratio while being powered by the pedals are important considerations. For the two-wheel drive bicycle 78 the front wheel 17 to rear wheel 90 rotational ratio is 0.9876 to 1.0000, that is, the front wheel 17 turns 0.9876 times for each 1 full rotation of the rear wheel 90. While it is conceivable to design a bicycle with varying front wheel to rear wheel gearing ratios (e.g., the front wheel turns at a range of 0.90 to 1.10 revolutions for each 1 revolution of the back wheel), in testing, a ratio which would cause the front wheel to turn at a rate equal to the rear wheel, or even at a rate of greater than 1:1 (front wheel to rear wheel ratio) would create a sense of front wheel drive. As described, the ratio of 0.9876:1.0000 provides the rider with good control and handling characteristics. However, the 0.9876:1.0000 ratio is not intended to be limiting for the subject invention, but rather represents the best mode described in the first and alternative embodiments described herein. Certain riding conditions, such as up hill racing where a "front wheel drive" sensation would be desirable, may make alternative ratios more desirable (e.g., the front wheel turns 1.10 times for each 1 revolution of the rear wheel). Therefore, the gearing ratios offered are for means of illustration only and should not be construed in any way as limiting since one skilled in the art could easily develop countless alternative gear ratio combinations. Additionally, those skilled in the art will recognize that a strategy of increasing ("stepping up") the revolutions of the shaft through gear ratios, then decreasing ("stepping down") the revolutions of the front wheel will lessen the torque load and enable construction of shaft systems of minimal diameter.

The two-wheel drive bicycle 78 achieves the desired 1:0.9876 rotational ratio by powering the front wheel 17 through 0.9876 revolutions for each full revolution of the rear wheel 90 by the interaction, positioning and sizes of the gears as shown in FIG. 4. The power is transferred from the modified drive sprocket 34, a 19 tooth sprocket, mounted on the rear drive sprockets 22 through the second drive chain 24 to the second drive sprocket 25, a 13 tooth sprocket, resulting in a rotational ratio of 1.46:1 ratio. The second drive sprocket 25 rotates simultaneously with the rear bevel gear 33 since both the second drive sprocket 25 and the rear bevel gear 33 are mounted on the short axle 35. In order to maintain the appropriate rotation needed to power the front wheel 17 in the same direction as the rear wheel 90, the rear bevel gear 33 is mounted proximal to the first rear drive system bracket 45. The rear bevel gear 33 mates with the rear pinion gear 26 mounted on the rear end of the main drive shaft 13. Said rear bevel gear 33 and said rear pinion gear 26 interface provides a 2:1 gear ratio yielding a total ratio to this point of the drive system of 2.92:1. That is, the main drive shaft 13 is now rotating at a rate of 2.92 for each rotation of the modified drive sprocket 34 which is turning at the same rate as the rear wheel 90. Power transferred from the main drive shaft 13 through the first miter gear 27, to the second miter gear 28, through the short connecting shaft 92, the first universal joints 29, the second short shaft 36, the second universal joint 30, the front drive shaft 20 to the front pinion gear 31 results in an unchanged rotation ratio of 2.92:1. The ratio of the front pinion gear 31 which is meshed with the front bevel gear 32 is 1:3 resulting in the final ratio of rotation between the front wheel 17 and back wheel to be 0.9876:1.

As disclosed the main drive shaft 13, the short connecting shaft 92, the second short shaft 36 and the front drive shaft 20 are manufactured of ½ inch solid steel shafts. An alternative composition for the solid shafts would be the use of ⅜ inch solid steel shafts. A further alternative would be to manufacture the shaft of ½ inch hollow steel with slightly over diameter in order to deliver the necessary torque levels while having the benefit of a reduced weight. As is well know in the art, metals and composites other than steel could be used as suitable substitutes for the shafts as long as they provided appropriate drive system strength.

Second Embodiment of the Invention

Figure 1:
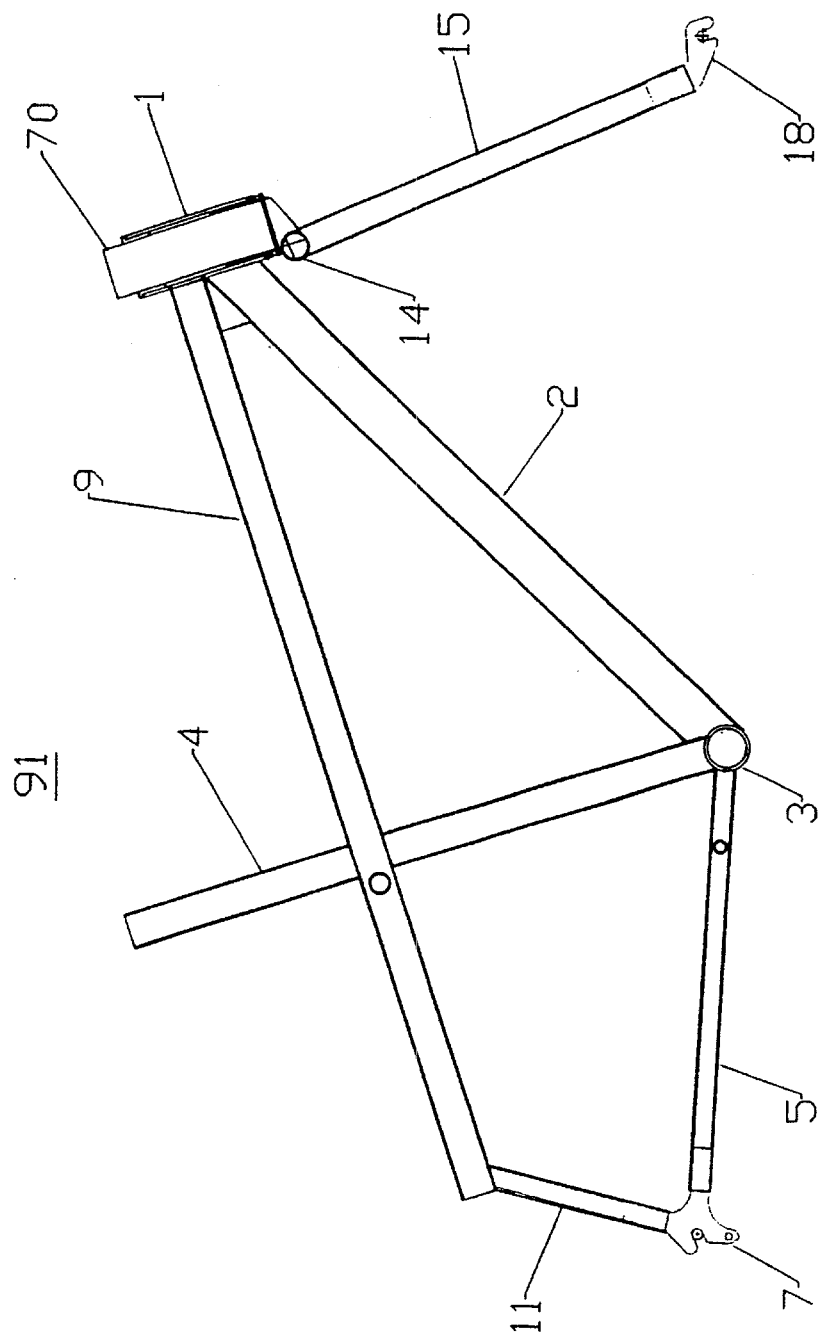
FIG. 1 is a right side view of the first embodiment of the main elements of the frame.
Figure 2:
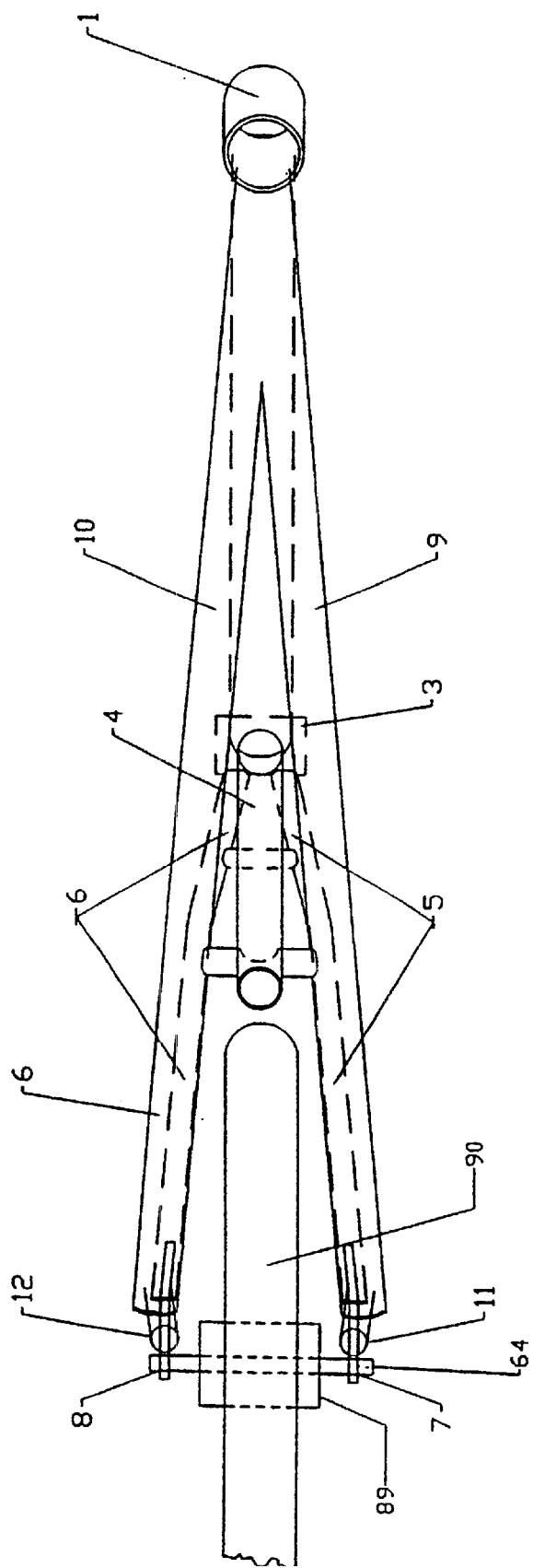
FIG. 2 is a top view of the main elements of the bicycle frame.
Figure 10:
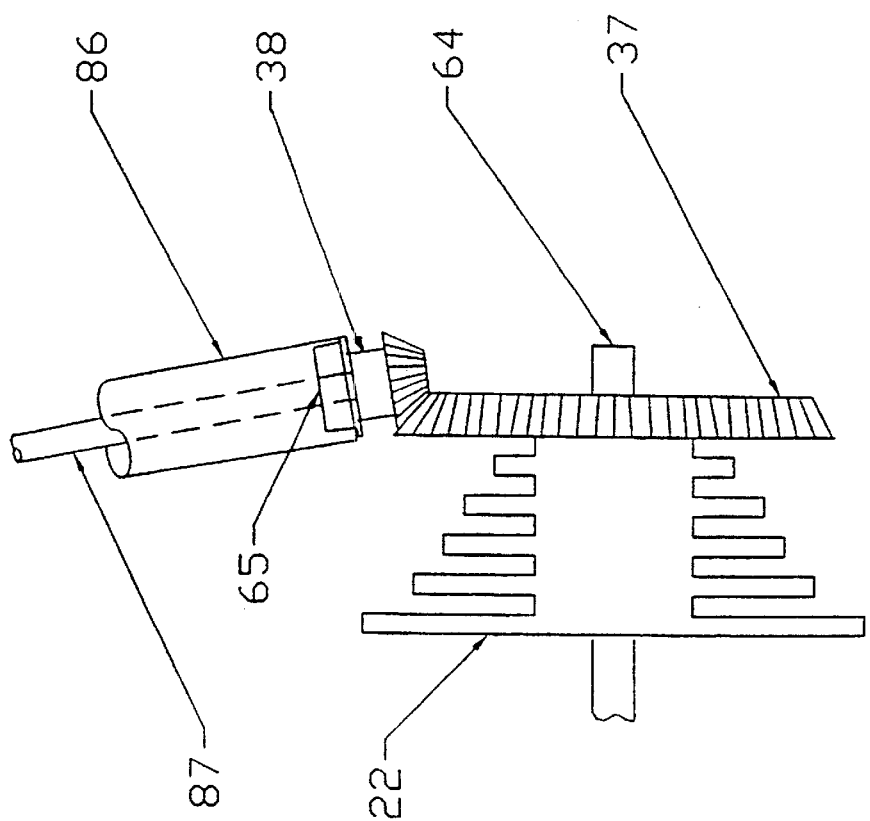
FIG. 10 is a view of the second embodiment of the modified rear sprocket assembly.
Figure 11:
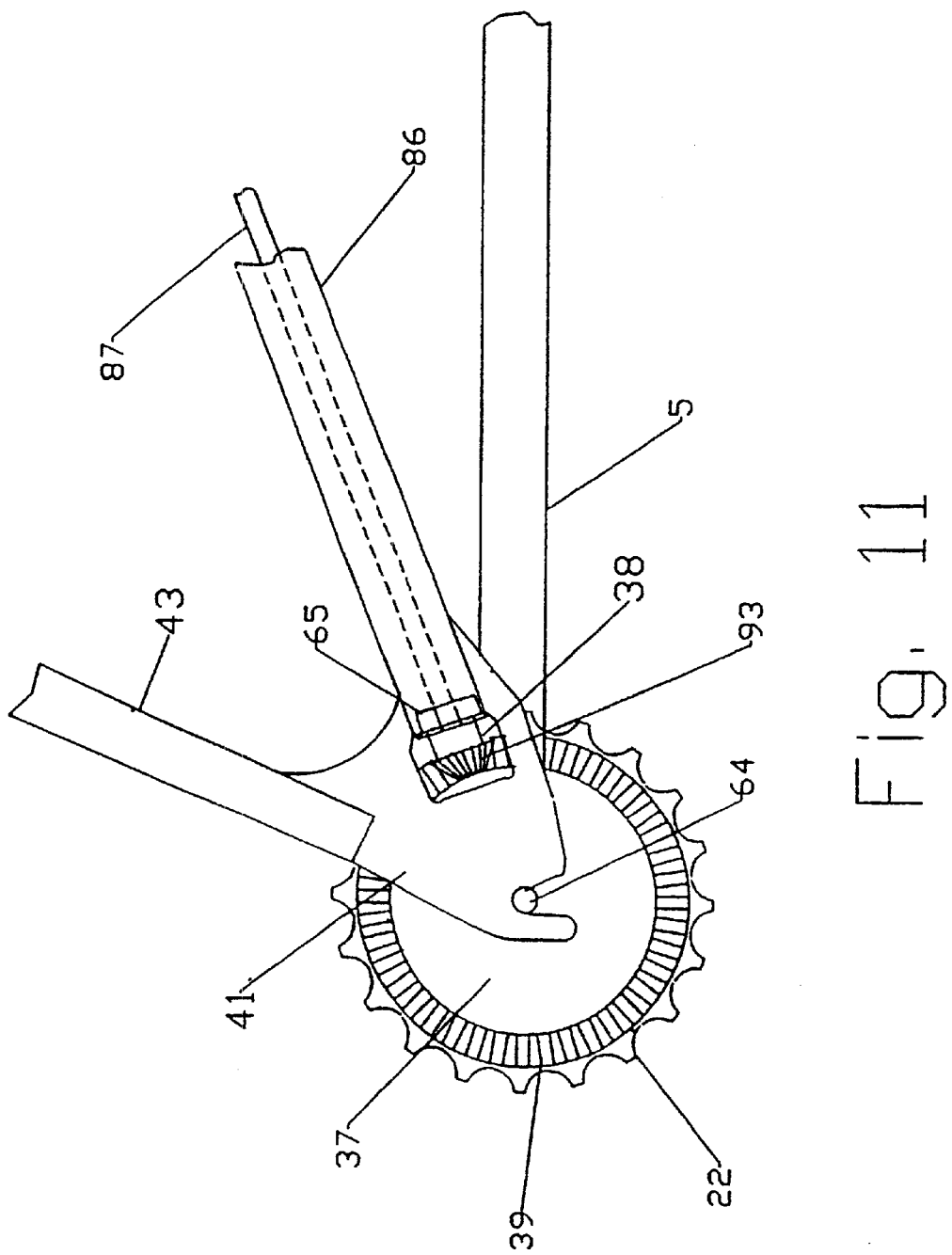
FIG. 11 is a view of the second embodiment of the rear drive assembly.
Figure 13:
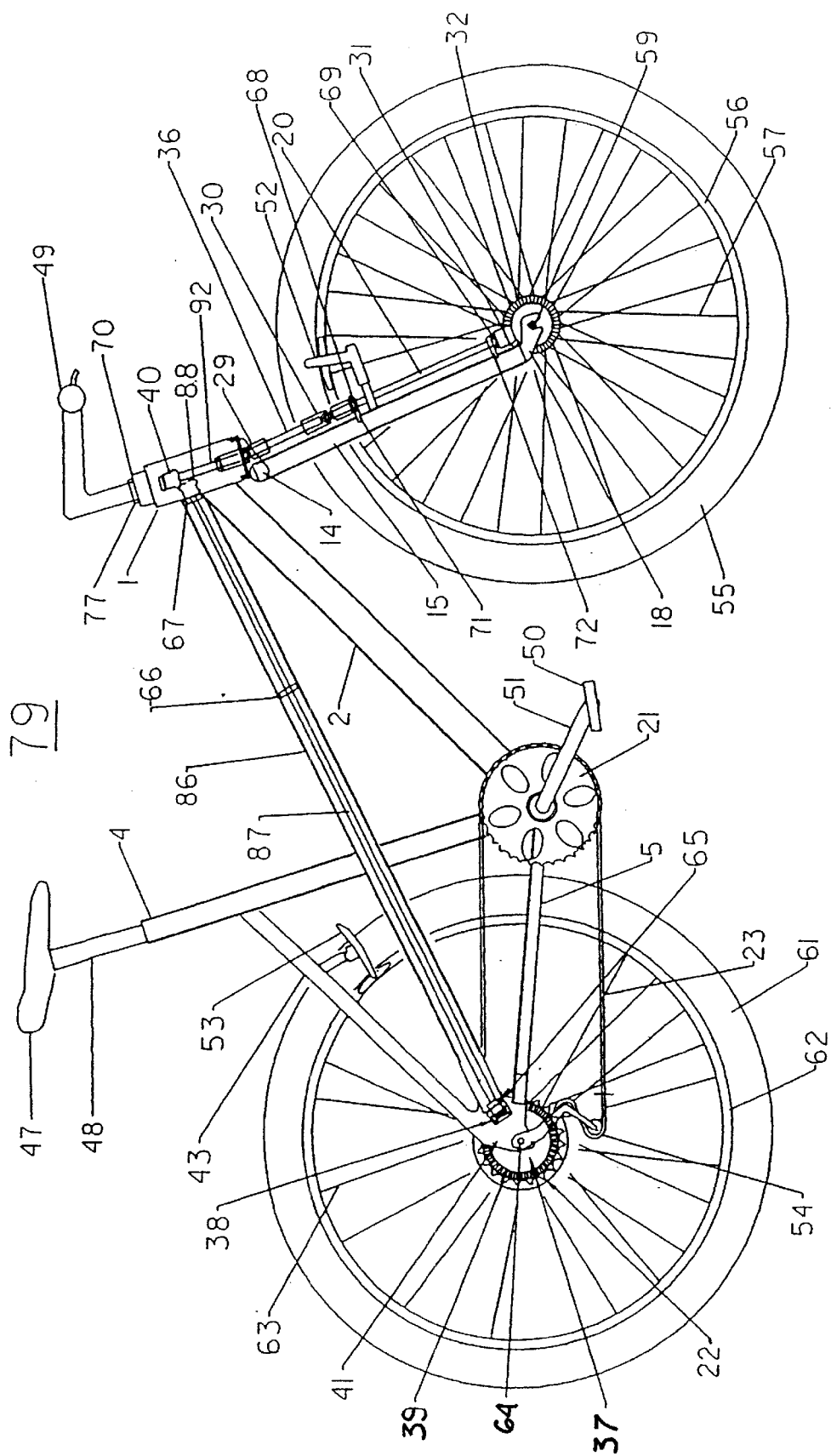
FIG. 13 is a view of the two-wheel drive bicycle as described in the second embodiment.

FIGS. 10, 11 and 13 illustrate aspects of a two-wheel drive bicycle 79 wherein the modified drive sprocket 34, the second drive chain 24, the second drive sprocket 25 and first rear drive system bracket 45 and the second rear drive system bracket 46 described in the first embodiment of the two-wheel drive bicycle 78 are replaced by a rear wheel bevel gear 37 and a drive shaft pinion gear 38 to power the front wheel in an alternative manner.

In the second embodiment of the two-wheel drive bicycle 79, the power transmitted to the rear drive sprockets 22 from the pedal crank shaft 51 through the chain 23 is transferred to the rear wheel bevel gear 37 mounted circumferentially on the outer region of the rear drive sprockets 22 to result in simultaneous turning of the rear drive sprockets 22 and the rear wheel bevel gear 37. The rear wheel bevel gear 37 meshes directly with a drive shaft pinion gear 38 to transfer power directly to the straight main drive shaft 87. As shown in FIGS. 10 and 11, the bevel gear teeth 39 of the rear wheel bevel gear 37 and pinion gear teeth 93 of the drive shaft pinion gear 38 are of a helical design and cut to accept an approximate 4 degree offset. This 4 degrees is necessary to align the straight main drive shaft 87 with the angle of the straight main drive tube 86 from the modified right rear dropout to the head tube 1.

In the second embodiment 79 as shown in FIG. 13, the straight main drive shaft 87 transmits power to the front drive system via a shaft miter gear 88 which interfaces with an upper miter gear 40 which in turn delivers the power to the front wheel 17 through the short connecting shaft 92, the first universal joint 29, the second short shaft 36, the second universal joint 30, the front drive shaft 20, the front pinion gear 31, to the front bevel gear 32 in order to drive the front wheel 17 as was previously described in the first embodiment 78. Except for the reversal of the orientation of the upper miter gear 40 to the top side of the shaft miter gear 88, the front drive system remains essentially unchanged in the two embodiments disclosed. Additionally, the use and positioning of rear drive shaft roller bearing 65, the center drive shaft roller bearing 66, and the front drive shaft roller bearing 67 to support the straight main drive shaft 87, remains unchanged in the second embodiment 79.

In the present embodiment 79, the upper miter gear 40 was moved to the upper end of the short connecting shaft 92 to accommodate the reverse rotation of the straight main drive shaft 87 which was necessitated by the placement of the rear wheel bevel gear 37 on the inside of the drive shaft pinion gear 38 since the rear drive sprockets 22 would interfere if the drive shaft pinion gear 38 was placed internal to the rear wheel bevel gear 37. The straight main drive shaft 87 enters into the straight main drive tube 86 of the bicycle 79 immediately after the modified right rear drop out 41 which allows for the straight main drive shaft 87 to extend into the head tube 1 of the bicycle 79. The design of the bicycle 79 is similar to the design discussed in the first embodiment 78 except that the straight main drive tube 86 connects directly to the right chain stay 5 at the modified right rear dropout 41 on the right side of the bicycle 79, and a straight main frame tube (not shown) connects directly to the left chain stay 6 at the left rear dropout (not shown) on the left side of the bicycle 79. Additionally, a right seat support 43 connects the modified right rear dropout 41 to the seat tube 4 on the right side of the bicycle and a left seat support (not shown) connects a left rear dropout on the left side of the bicycle to the seat tube 4 and may be necessary to provide additional support for the weight of the rider. The modified right rear dropout 41 described in the second embodiment 79 has a center section cutout which is necessary to allow proper clearance and alignment of the drive shaft pinion gear 38 attached at the rear end of the straight main drive shaft 87 and extending out from the rear end of the straight main drive tube 86. This cutout also allows for ease of maintenance and cleaning of the system.

In the second embodiment of the two-wheel drive bicycle 79, the rear wheel bevel gear 37 is three inches in diameter and the drive shaft pinion gear 38 is specially designed so that the meshing of the rear wheel bevel gear 37 and drive shaft pinion gear 38 transmits power through the drive system to achieve a final rear wheel 90 to front wheel 17 rotational ratio of between 1.00:0.97 and 1.00:0.99. Said design of the drive shaft pinion gear 38 is well known in the art and merely relies upon the ratio of the number of bevel gear teeth 39 to the number of pinion gear teeth 93 to create the final gearing ratio. Additionally, the rear wheel bevel gear 37 is mounted on the low gear side of the rear drive sprockets 22 at a close clearance distance to the rear end of the straight main drive tube 86 of the bicycle 79. This distance is necessary to enable proper alignment of the drive shaft pinion gear 38 on the end of the straight main drive shaft 87 as it meshes with the rear wheel bevel gear 37. The drive shaft pinion gear 38 extends out of the rear end of the straight main drive tube 86 and rests in the center of the modified right rear dropout 41.

In considering this invention, it should be remembered that the present disclosure is only illustrative, and the scope of the invention should be determined by the specification which is not intended to be limited to the embodiments disclosed here. This invention successfully discloses both the design and the construction of a two-wheel drive all terrain bicycle. The two-wheel drive system dramatically increases traction and mobility, especially during uphill climbs on loose or slippery material. In order to further reduce the weight of the bicycle, a weight reduction could be sought for the drive train components. A hollow rigid main drive shaft capable of transmitting the necessary amount of torque, possibly made out of composites, will significantly reduce the weight. Also, larger but lighter aluminum or composite gears could be used for the front and rear bevel systems. This could mean an overall weight reduction of 3–4 pounds which would make the bicycle's weight extremely competitive. The invention discloses an excellent method of manufacturing a functional two-wheel drive bicycle with an attractive design. As envisioned, this fully integrated two-wheel drive bicycle would not only compete with the most advanced bicycles on the market but would also create an entirely new category in the industry.

Figure 14:
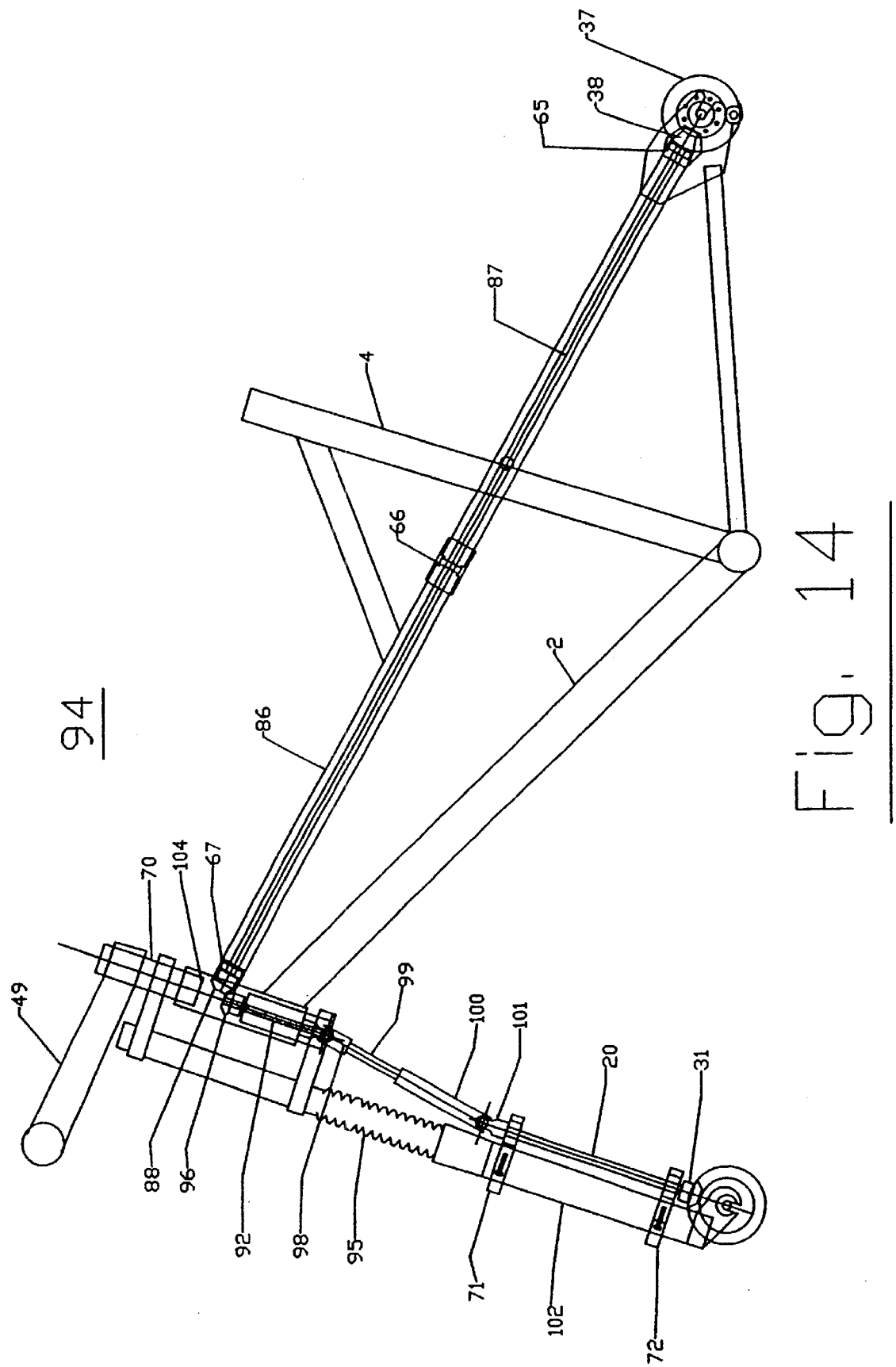
FIG. 14 is a view of the two-wheel drive bicycle with a shock-absorbing front fork as described in the third embodiment.

Third Embodiment of the Two-Wheel Drive Bicycle with a Shock-Absorbing Front Fork FIGS. 14, 15, and 16 illustrate aspects of a two-wheel drive bicycle 94 that incorporates a suspension system, in particular a shock-absorbing front fork 95. In the third embodiment of the two-wheel drive bicycle 94, power is transferred from the pedals (not shown) to the rear wheel bevel gear 37 mounted circumferentially on the outer region of the rear drive sprockets (not shown) to result in simultaneous turning of the rear drive sprockets (not shown) and the rear wheel bevel gear 37. The rear wheel bevel gear 37 meshes with a drive shaft pinion gear 38 to transfer power to the straight main drive shaft 87. The use and positioning of rear drive shaft roller bearing 65, the center drive shaft roller bearing 66, and the front drive shaft roller bearing 67 to support the straight main drive shaft 87 are as previously described for the second embodiment.

In the third embodiment of the two-wheel drive bicycle 94 as shown in FIG. 14, the straight main drive shaft 87 transmits power to the front drive system via a shaft miter gear 88 which interfaces with a second miter gear 96. The second miter gear 96 in turn delivers power to the front wheel 17 through the short connecting shaft 92, an expandable universal joint system 97 (see FIGS. 15 and 16), the front drive shaft 20, the front pinion gear 31, and the front bevel gear 32 in order to drive the front wheel 17. The expandable universal joint system 97, is featured in a broken-out view in FIG. 16 and includes a first universal joint 98, a splined sliding inner shaft 99, a splined sliding outer shaft 100, and a second universal joint 101.

In the third embodiment of the two-wheel drive bicycle 94, the second miter gear 96 replaces the upper miter gear 40 of the second embodiment of the two-wheel drive bicycle 79. However, the relative positioning of the shaft miter gear 88 and the second miter gear 96 shown in the third embodiment of the two-wheel drive bicycle should not be considered as limiting in any manner for the present invention.

FIGS. 14 and 15 illustrate aspects of the two-wheel drive bicycle 94 design which encompass a front fork assembly with a shock-absorbing front fork 95 and includes a neck tube 70 that is connected at both ends to the shock-absorbing front fork 95. The shock-absorbing front fork 95 has a left fork member 102 and a right fork member 103 (as viewed from the rider's perspective) that pass along the sides of the front tire 17. The right fork member 103 holds the front drive shaft 20 in the present embodiment 94. The left fork member 102 and the right fork member 103 each includes a shock-absorbing section that allows the left fork member 102 and the right fork member 103 to expand and to shorten in length.

The neck tube 70 has a cutout section as previously described to enable pivoting around the shaft miter gear 88 and the second miter gear 96 during steering of the bicycle 94. The head tube 104 of the third embodiment of the two-wheel drive bicycle 94 is of sufficient diameter to enclose the meshing shaft miter gear 88 and second miter gear 96. Alternative embodiments (not shown) would eliminate the need for a head tube 104 thereby exposing the shaft miter gear 88, the second miter gear 96, and the short connecting shaft 92.

As shown in FIGS. 14 and 15, the expandable universal joint system 97 has a first universal joint 98, a sliding inner shaft 99, a sliding outer shaft 100, and a second universal joint 101. The expandable universal joint system 97 is mounted upon the shock-absorbing front fork 95 so that, upon expansion or contraction of the left fork member 102 and right fork member 103, the sliding outer shaft 100 will slide over the sliding inner shaft 99 to adjust with the differing overall length of the shock-absorbing front fork 95. While the sliding outer shaft 100 slides over the sliding inner shaft 99, the sliding outer shaft 100 and the sliding inner shaft 99 remain in contact so that they can continue to rotate in unison for maintaining power transmission to the front wheel.

The disclosed front fork assembly with the shock-absorbing front fork 95 is not to be construed as limiting the present invention. Those skilled in the art will recognize alternative designs for a front fork assembly that incorporates a suspension system and that can be attached to the frame without interfering with steering or rotation of the front wheel. Additionally, the disclosed front drive shaft system with the expandable universal joint system 97 is not to be construed as limiting. Those skilled in the art will understand alternative designs for an adjustable drive component that adjusts with the movement of front wheel relative to the frame as shock is applied while maintaining power transfer to the front wheel. Finally, the drive system disclosed in the third embodiment can alternatively include the modified drive sprocket 34, the second drive chain 24, and the second drive sprocket 25 as described in the first embodiment of the two-wheel drive bicycle 78 to transmit power to the front wheel.

Fourth Embodiment of the Two-Wheel Drive Bicycle with a Shock-Absorbing Front Fork FIGS. 17 and 18 illustrate an aspect of a two-wheel drive bicycle that incorporates a shock-absorbing fork 110. In the fourth embodiment of the two-wheel drive bicycle, power is transferred from the rear wheel to the short connecting shaft 92 through the same drive components (not shown) as described in the third embodiment. In the fourth embodiment, power is transferred through the short connecting shaft 92, the first universal joint 98, the second short shaft 36, the second universal joint 101, an expanding straight drive shaft system 109, and the front pinion gear 31 to the front bevel gear 32 in order to drive the front wheel 17. The expanding straight drive shaft system 109 features a first splined sliding shaft 105 and a second splined sliding shaft 106 and is shown in a broken-out view in FIG. 18.

The fourth embodiment of the front fork assembly features a shock-absorbing fork 110 that includes a neck tube 70 that is connected at both ends to the shock-absorbing fork 110. The shock-absorbing fork 110 has an expandable left fork member 107 and an expandable right fork member 108 (as viewed from the rider's perspective) that pass along the sides of the front tire 17. In the fourth embodiment, the expandable right fork member 108 holds the expanding straight drive shaft system 109. The expanding left fork member 107 and the expanding right fork member 108 each include a shock-absorbing section that allows the expanding left fork member 107 and the expanding right fork member 108 to expand and to shorten in length.

As shown in FIGS. 17–18, the expanding straight drive shaft system 109 is mounted on the expanding right fork member 108 so that upon expansion or contraction of the expanding right fork member 108, the first sliding shaft 105 will slide within the second sliding shaft 106 to adjust with the differing overall length of the shock-absorbing fork 110. While the first sliding shaft 105 slides over the second sliding shaft 106, the first sliding shaft 105 and the second sliding shaft 106 remain in contact so that they can continue to rotate in unison for maintaining power transmission to the front wheel 17.

The disclosed front fork assembly with the shock-absorbing fork 110 is not to be construed as limiting the present invention. Those skilled in the art will recognize alternative designs for a front fork assembly that incorporates a suspension system and that can be attached to the frame without interfering with steering or rotation of the front wheel. Additionally, the disclosed expanding straight drive shaft system 109 is not to be construed as limiting. Those skilled in the art will understand alternative designs for an adjustable drive component that adjusts with the movement of front wheel relative to the frame as shock is applied while maintaining power transfer to the front wheel.
Fifth Embodiment of the Two-Wheel Drive Bicycle with a Shock-Absorbing Front Fork In the fifth embodiment of the two-wheel drive bicycle (not shown), alternate drive components are disclosed to transmit the power from the main drive shaft 87 to the short connecting shaft 92. In the fifth embodiment of the two-wheel drive bicycle (not shown) alternate drive components are disclosed which replace the shaft miter gear 88 and the second miter gear 96 as disclosed in the third embodiment of the two-wheel drive bicycle 94. These alternate drive components include but are not limited to alternate gearing combinations and alternate universal joint combinations. One alternate drive component would have a screw-type gear (not shown) on the forward end of the main drive shaft 87 and a meshing second gear (not shown) on the upper end of short connecting shaft 92, wherein the screw-type gear (not shown) is in continual contact with and powers the meshing gear (not shown) for rotating the short connecting shaft 92. Additionally, pinion and bevel gear combinations may be utilized. Another alternate drive component would have a universal joint combination to transfer power from the main drive shaft 87 to the short connecting shaft 92.

In the fifth embodiment of the two-wheel drive bicycle (not shown), the shock-absorbing front fork 95 is connected to the neck tube 70, which includes a cutout section as previously described, to enable the neck tube to pivot around the alternate drive components disclosed herein.

The alternate drive components disclosed herein are not to be construed as limiting and more generally include any gearing or joint combination which successfully passes through the approximate 90 degree angle from the main drive shaft 87 down to the short connecting shaft 92. Those skilled in the art will recognize other methods and gearing or joint combinations, including any drive component which does not interfere with the turning radius of the front wheel while enabling power to be transmitted from the main shaft down to the front wheel. While the above is directed to the third embodiment of the present invention, those skilled in the art will recognize that alternate drive components can replace the miter gears of the first, second, and further embodiments of the invention without departing from the basic scope of the invention, which scope is determined by the claims which follow.
Sixth Embodiment of the Two-Wheel Drive Bicycle Featuring a Rear Suspension System with a Ball Spline Universal Joint FIG. 19 illustrates a two-wheel drive bicycle 111 that incorporates a rear suspension 112 into the bicycle frame. In particular, the front wheel drive incorporates an expandable telescoping rear ball spline universal joint system 113 near the pivot point 114 that expands and contracts to accommodate vertical travel of the rear wheel 61 in order to provide a more comfortable ride. FIG. 20 shows a detailed view of the telescoping rear ball spline universal joint system 113.

In the sixth embodiment of the two-wheel drive bicycle 111, power is transferred from the pedals 50 and pedal crank shaft 51 through the chain 23 to the rear drive sprockets (not shown) to result in the simultaneous turning of the rear drive sprockets (not shown) and the rear wheel spiral bevel gear 293 that is mounted circumferentially on the rear hub 142 opposite the rear drive sprockets. In the sixth embodiment of the two-wheel drive bicycle 111, the bicycle frame includes a front frame section 115 and a rear triangle section. The front frame section 115 includes the head tube 1, the upper frame tube 117, the short seat tube 119, a down drive tube 118, and is pivotably attached to the rear triangle section at the pivot point 114. The rear triangle section includes a left chain stay 6, a right chain stay (not shown), a rear drive tube 120, a right frame tube (not shown), and a rear triangle support tube 121. As is well known in the art, the rear triangle section also pivotably attaches to the front frame section 115 through the rear suspension 112 to allow the rear triangle section to pivot around the pivot point 114 thereby providing the rider with movement of the rear wheel 61 in response to bumps.

In the sixth embodiment of the two-wheel drive bicycle, the rear wheel spiral bevel gear 293 meshes with a rear drive shaft spiral pinion gear 294 that is attached to and which transfers power to a rear drive shaft 122 located within the rear drive tube 120. The telescoping rear ball spline universal joint system 113 is attached to the front end of the rear drive shaft 122 and attaches and transfers power to a front drive shaft 123 located within the down drive tube 118.

Both the front drive shaft 123 and the rear drive shaft 122 of the sixth embodiment of the two-wheel drive bicycle 111 are supported at each end within the down drive tube 118 and rear drive tube 120 respectively by bearings. Additionally, the rear drive shaft 122 is splined at its lower end and extends completely through the drive shaft spiral pinion gear 294 in the present embodiment and is further supported at the left rear dropout 8 by a first rear dropout bearing 297 that is positioned on the rear drive shaft 122 forward of the drive shaft spiral pinion gear 294 and a second rear dropout bearing 298 that is positioned on the rear drive shaft 122 to the rear of the rear drive shaft spiral pinion gear 294. This configuration provides a great amount of support and stability for the rear drive shaft spiral pinion gear 294 as it meshes with and is driven by the rear wheel spiral bevel gear 293. This configuration is not, however, to be construed as limiting, and other methods for adequately supporting the rear drive shaft 122 are envisioned. The use of spiral or helical gears in the present embodiment is important for both reduction of front wheel drive noise and increased strength of the gear teeth. This configuration is not, however, to be construed as limiting, and other methods for adequately supporting the rear drive shaft 122 are envisioned.

As shown in FIGS. 19 and 20, the telescoping rear ball spline universal joint system 113 connects the rear drive shaft 122 with the front drive shaft 123. In the present embodiment, the front drive shaft 20 attaches to a first ball spline universal joint 124 that is attached to splined inner sliding shaft 125. An outer splined sliding shaft 126 slides along and rotates with the inner sliding shaft 125 as the front wheel drive rotates and is attached to a second ball spline universal joint system 127 that is attached to the rear drive shaft 122. In that fashion, the telescoping rear ball spline universal joint system 113 both rotates as the front wheel drive turns and also lengthens and shortens as the rear triangle section 116 pivots with respect to the front frame section 115 around the pivot point 114.

As shown in FIG. 19, in the sixth embodiment of the two-wheel drive bicycle 111, the front drive shaft 123 transmits power to the front wheel 17 via a front drive shaft gear 128 which interfaces with a second front drive gear 129. The second front drive gear 129 in turn delivers power to the front wheel 17 of the two-wheel drive bicycle 111 through the short connecting shaft 92, the expandable universal joint system 97 (as disclosed in the third embodiment), the front drive shaft 123, the front spiral pinion gear 295, and the front spiral bevel gear 296. Additionally, in the sixth embodiment, as with the earlier embodiments, the neck tube 70 is cut away to enable pivoting around the front drive shaft gear 128 and the second front drive gear 129 when the rider rotates the steering mechanism 130.

The disclosed rear suspension 112 for the two-wheel drive bicycle 111 with a telescoping rear ball spline universal joint system 113 is not to be construed as limiting the present invention. Those skilled in the art will recognize alternative designs for a full suspension frame design and subsequent incorporation into the frame of the front wheel drive. Additionally, the disclosed telescoping rear ball spline universal joint system 113 is not to be construed as limiting since a universal joint system using pins, as disclosed in the prior embodiments, could easily substitute as a suitable system for the front wheel drive. Moreover, other universal joint systems or rigid linkage systems, including very short sections of cable shaft section (not shown) could be utilized where the telescoping rear ball spline universal joint system 113 in the front wheel drive is positioned very close to the pivot point 114 provided the use of a cable shaft section (not shown) did not result in any significant friction, loss of power transmission to the front wheel, or front wheel drive noise.

Those skilled in the art will understand alternative designs for an adjustable and flexible rear suspension system that adjusts with the movement of rear wheel relative to the pivot point, including placing the adjustable and flexible drive component at or very near the pivot point so that very little lengthening and shortening of the rear linkage system would occur even with large movements of the rear wheel thus eliminating the need for a rear telescoping ball spline universal joint.

Seventh Embodiment of the Two-Wheel Drive Bicycle Featuring a Four-Bar Linkage Front Suspension for a Front Wheel Drive Incorporated into the Front Fork Member FIG. 21 shows a view of a two-wheel drive bicycle 131 featuring integration of the front wheel drive into a four-bar linkage front suspension 132. Additionally, components of the front wheel drive for the four-bar linkage front suspension 132 shown in FIG. 21 are integrated into the left linkage fork member 137. The four-bar linkage front suspension 132 also features a left rake adjuster bar 134 and a right rake adjuster bar (not shown) that allow the rider to adjust the rake (fork angle relative to the ground) of the two-wheel drive bicycle 131 depending upon riding conditions.

The four-bar linkage front suspension 132 is well known in the bicycle and motorcycle industries for its ability to absorb shock more into the frame of the bicycle and less into the steering mechanism and, thus, into the arms and shoulders of the rider. The front wheel drive includes a rear bevel gear 37 mounted on the rear hub 142 that meshes with and drives a drive shaft pinion gear 38 mounted on the rear end of the rear drive shaft 122. A telescoping rear ball spline universal joint system 113 attaches the front end of the rear drive shaft 122 to the rear end of a front linkage drive shaft 135. The front linkage drive shaft 135 includes a first front linkage drive gear 136 at its front end. In the seventh embodiment of the two-wheel drive bicycle 131, as in the sixth embodiment disclosed above, a full suspension frame configuration with a rear ball spline universal joint system 113 is shown, however, the frame could also be of a fixed frame configuration as shown in the second embodiment and not include the rear telescoping ball spline universal joint.

The four-bar linkage front suspension 132 of the seventh embodiment does not include a typical head tube configuration as shown in the previous embodiments. Rather, the four-bar linkage front suspension 132 is pivotably attached directly to the front end of the down drive tube 118 and the upper ends of the left fork post 133 and right fork post (not shown) via the left rake adjuster bar 134 and right rake adjuster bar (not shown) respectively. The linkage fork crown 138 then pivotably attaches with a ball and socket joint 139 to left front linkage arm 140 and right front linkage arm (not shown) and attaches the lower ends of the left fork post 133 and right fork post (not shown) to the upper ends of the left linkage fork member 137 and right linkage fork member (not shown) respectively.

The lower ends of the left linkage fork member 137 and the right linkage fork member (not shown) then attach to the front hub 141 at the left linkage fork dropout 143 and right linkage fork dropout (not shown). As illustrated, the "four-bar" linkage front suspension 132 forms a parallelogram and includes as its four "bars," the pivotable attachment of i) the front end of the down drive tube 118 to ii) the left rake adjuster bar 134 and the right rake adjuster bar (not shown) to iii) the upper ends of the left fork post 133 and the right fork post (not shown) respectively, and iv) the linkage fork crown 138 to the left front linkage arm 140 and right linkage arm (not shown) which then pivotably connect to the down drive tube 118.

In the seventh embodiment of the two-wheel drive bicycle 131, the first front linkage drive gear 136 meshes with and powers a second front linkage drive gear 144 located at the front end of the down drive tube 118 within the steering mechanism support casing 145 and immediately behind the steering mechanism support casing 145. Unlike the two-wheel drive bicycle 79 disclosed in the second embodiment where the neck tube 70 featured a cut-away, in the seventh embodiment of the two-wheel drive bicycle 131, the first front linkage drive gear 136 and second front linkage drive gear 144 interface very close to the axis of steering within the front end of the down drive tube 118 proximate the steering mechanism 130 and within the steering mechanism support casing 145.

The proximity of the first front linkage drive gear 136 and second front linkage drive gear 144 to the steering mechanism 130 and steering mechanism support casing 145 acts to minimize any torque reactions resulting from the rotation of the front wheel drive. Additionally, in the present embodiment, the first front linkage drive gear 136 and second front linkage drive gear 144 mesh at a 90 degree angle. However, meshing angles less than 90 degrees and more than 90 degrees are easily created and a 90 degree meshing angle should not be construed as limiting to the present invention.

The second front linkage drive gear 144 delivers power to the front wheel 17 through a short connecting shaft 92, a telescoping linkage ball spline universal joint system 146, the internal front linkage drive shaft 147 to an attached front linkage drive shaft gear 148. The front linkage drive shaft gear 148 then meshes with and drives the front bevel gear 32 which drives the front wheel 17. The telescoping linkage ball spline universal joint system 146, operates similarly to the telescoping rear ball spline universal joint system 113 shown in FIG. 20 in the sixth embodiment and attaches to the second front linkage drive gear 144 through the short connecting shaft 92 very close to the axis of steering to minimize any torque reactions which would negatively affect steering. Additionally, an expandable universal joint system as disclosed in the third embodiment could be utilized in the front wheel drive of the four-bar linkage front suspension 132. Finally, a short connecting shaft 92 may be unnecessary in certain configurations featuring the telescoping front ball spline universal joint system 146 attached directly to the second front linkage drive gear 144.

An additional aspect of the two-wheel drive bicycle 131 shown in FIG. 21 is that the internal front linkage drive shaft 147 is enclosed within the left linkage fork member 137. Additionally, pivotably attached at the upper end of the left fork post 133 and right fork post (not shown) is a left rake adjuster bar 134 and right rake adjuster bar (not shown) respectively. Each rake adjuster bar has at least two front rake adjustment locations: a front rake adjustment location 149, and a rear rake adjustment location 150 to which the left fork post 133 and right fork post (not shown) can be optionally attached in order to enable the rider to adjust the rake of the two-wheel drive bicycle. By moving the location of the left fork post 133 and right fork post (not shown) from their respective front rake adjustment location 149 to the respective rear rake adjustment location 150 the rider can adjust the rake of the front fork to adapt to the riding conditions.

The disclosed adaptation of the front wheel drive for the two-wheel drive bicycle to the four-bar linkage front suspension is not to be construed as limiting the present invention. Those skilled in the art will recognize alternative designs for linkage suspensions and corresponding locations of the front wheel drive. Additionally, the number of rake adjustment holes is not to be construed as limiting and each rake adjuster bar could easily consist of three or more rake adjustment holes.

Figure 22:
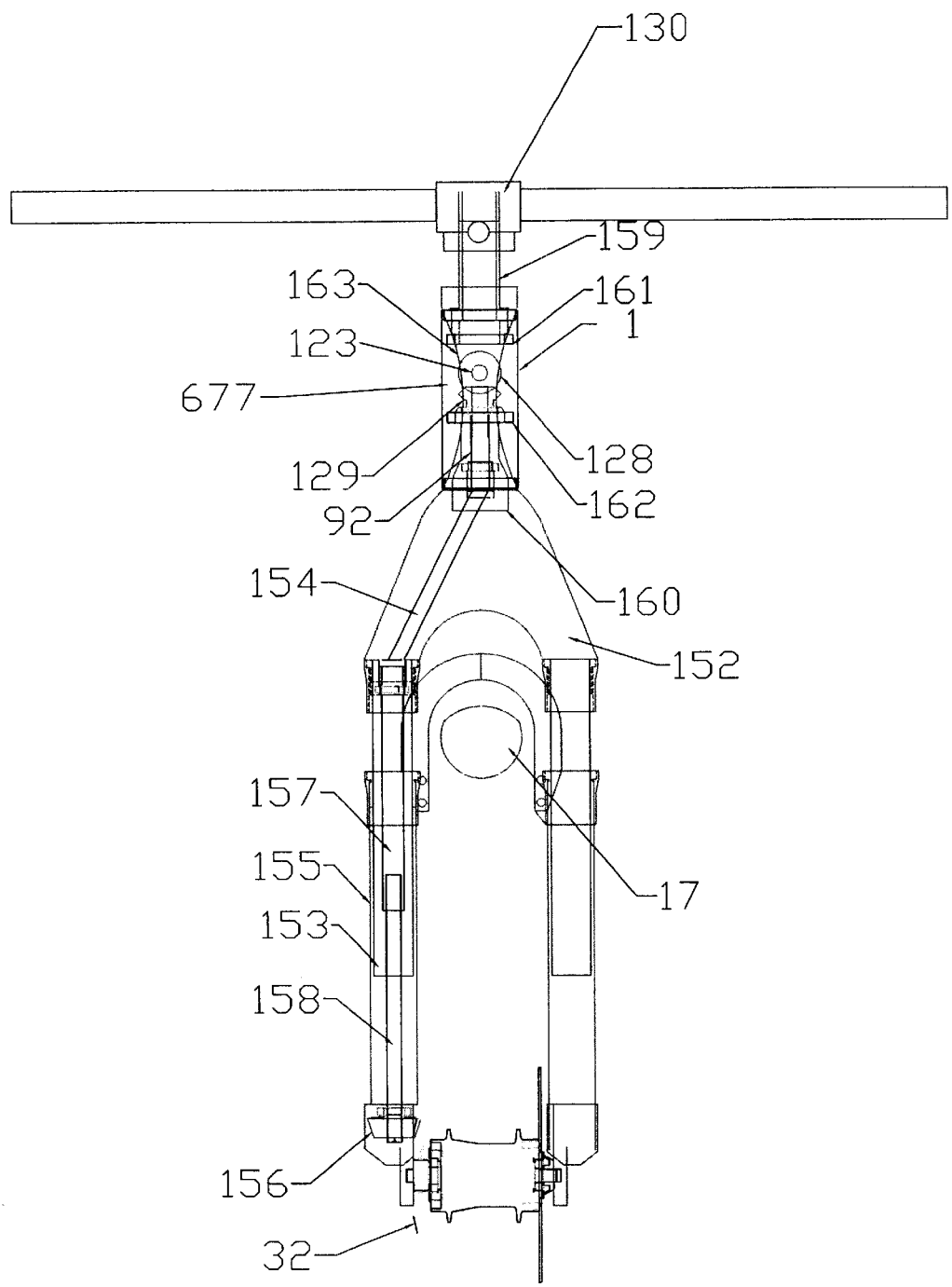
FIG. 22 is a front view of a single crown shock-absorbing front fork for a two-wheel drive bicycle that entirely encloses the front wheel drive.

Eighth Embodiment of the Two-Wheel Drive Bicycle Featuring the Front Wheel Drive Entirely Enclosed within a Single Crown Shock-Absorbing Front Fork FIG. 22 illustrates the eighth embodiment of a two-wheel drive bicycle featuring a single crown shock-absorbing front fork 151 wherein the front wheel drive is entirely enclosed within the single crown shock-absorbing front fork 151 from the head tube 1, through a single fork crown 152 and right single crown drive tube 153, to the front wheel 17 and includes an internal ball spline universal joint system 154 within the single fork crown 152.

As shown in FIG. 22, a front drive shaft gear 128 receives power from the rear wheel (not shown) through the front drive shaft 123 and meshes with a second front drive gear 129. The second front drive gear 129 in turn delivers power to the front wheel 17 through a short connecting shaft 92 to an internal ball spline universal joint system 154 to an internal front fork drive shaft system 155 to a fork drive shaft gear 156. The fork drive shaft gear 156 then rotationally meshes with and transfers power to the front bevel gear 32 in order to drive the front wheel 17.

The internal ball spline universal joint system 154 of the eighth embodiment may be either expandable as disclosed in the sixth and seventh embodiments and FIG. 20, or alternatively, may be of a fixed length. As shown in the eighth embodiment, the use of a internal ball spline universal joint system 154 of fixed length requires that the internal fork drive shaft system 155 be comprised of a first internal sliding fork drive shaft 158 that slides within and rotates with a second internal sliding fork drive shaft 157 to accommodate the increasing and decreasing length of the single crown shock-absorbing front fork 151. This assembly is similar to the configuration shown in FIG. 18 which utilizes a first sliding shaft 105 and a second sliding shaft 106 to expand and to shorten in length in response to expanding fork members. Alternatively, a front telescoping or fixed universal joint could be utilized in place of the internal ball spline universal joint system 154.

In the present embodiment, as shown in the third embodiment in FIG. 15, the center portion of the neck tube defines cut away 677 resulting in an upper neck tube section 159 and a lower neck tube section 160 to enable pivoting around the front shaft drive gear 128 and the second front drive gear 129 while turning the steering mechanism (not shown). Finally, in order to accommodate a single crown configuration, the upper neck tube section 159 and lower neck tube section 160 are rotationally supported within the head tube 1 via upper head tube bearings 161 and lower head tube bearings 162 and are externally supported via the attachment of the single fork crown 152 at the lower neck tube section 160 and with a single crown support bridge 163 attached at the lower end to the single fork crown 152 and to the upper end of the upper neck tube section 159.

The single crown support bridge 163 is external to and rotates around the head tube 1 when the steering mechanism 130 and single crown shock-absorbing front fork 151 are rotated. More specifically, it is either a continual section or separate piece of light-weight, high-strength metal from the single fork crown 152 to the upper neck tube section 160. The single crown support bridge 163 may be shaped to be slightly larger than the outer 25 diameter of the head tube 1 in order to be both functional in its rotation around the head tube as well as be aesthetically appealing. The single crown support bridge 163 is similarly configured as recumbent neck tube support bridge 291 shown in FIG. 35.

Ninth Embodiment of the Two-Wheel Drive Bicycle Featuring the Front Wheel Drive Entirely Enclosed within a Dual Crown Shock-Absorbing Front Fork FIGS. 23, 24 and 25 illustrate alternative views of the ninth embodiment of a two-wheel drive bicycle featuring a dual crown shock-absorbing front fork 164 wherein the front wheel drive is entirely enclosed within the dual crown shock-absorbing front fork 164 from the head tube 1, through a lower fork crown 165 and a right fork drive tube 166, to the front wheel 17 and further includes a series of meshing crown gears 167 within the lower fork crown 165.

As illustrated in FIGS. 24 and 25, the series of meshing crown gears replace the internal ball spline universal joint system 154 shown in the eighth embodiment of the two-wheel drive bicycle. FIG. 25 shows a top view of the series of meshing gears 167 of the present embodiment further including a first crown gear 168, a second crown gear 169, and a third crown gear 170 that are rotationally supported within the lower fork crown 165. Pins and bearings may further support the series of meshing gears 167 within the lower fork crown 165. In the present embodiment, the series of meshing crown gears 167 are helical gears. Alternatively, straight meshing gears could be utilized. Additionally, a sliding internal front drive shaft 171 rotates with and slides into a center hole of the third crown gear 170 in order to adjust for the lengthening and shortening of the dual crown shock-absorbing front fork 164. The sliding internal front drive shaft 171 of the present embodiment replaces the telescoping front ball spline universal joint system 113 or the internal fork drive shaft system 155 shown in the sixth and eighth embodiments to adjust for movement of the front fork. In the present embodiment, the sliding internal front drive shaft 171 is splined at its upper end to enable it to easily slide into the third crown gear 170. Alternatively, the internal front drive shaft 170 could be square or of another configuration at its upper end to enable it to slide into and rotate with the third crown gear 170.

In the current embodiment, power is transferred from the rear wheel (not shown) through a main drive shaft 87 to a front drive shaft gear 128, to a second front drive gear 129, to a short connecting shaft 92 that is attached at its lower end to the first crown gear 168. The first crown gear 168 meshes with and turns the second crown gear 169 which meshes with and turns the third crown gear 170. Rotational power is then transferred from the rotation of the third crown gear 170 to the sliding internal front drive shaft 171 to the fork drive shaft gear 156 which meshes with and powers the front bevel gear 32 that is attached to and powers the front wheel 17.

Alternatively, as discussed in the eighth embodiment, an internal fork drive shaft system 155 comprised of a first sliding fork drive shaft 158 that slides within and rotates with a second sliding fork drive shaft 157 may be used in order to accommodate the increasing and decreasing length of the shock-absorbing front fork. This configuration could be used to eliminate the need to have a sliding internal fork drive shaft 171 slide up and down within the third crown gear 170. In that way, the internalized series of meshing gears could be located within a single crown shock absorbing front fork including a single crown support bridge 163 as discussed in the eighth embodiment.

The disclosed internalization of the front wheel drive into the dual crown shock absorbing front fork 164 is not to be construed as limiting the present invention. Those skilled in the art will recognize alternative designs for internalizing a front wheel drive in the front fork including the use of alternative linkages enabling front wheel shock absorption. Additionally, the number of crown gears located within the lower fork crown 165 of the ninth embodiment is not to be construed as limiting and could easily comprise a series 167 of at least two crown gears.

As with earlier embodiments, the center portion of the neck tube defines cut away 677 resulting in an upper neck tube section 159 and a lower neck tube section 160 to enable pivoting around the front drive shaft gear 128 and the second front drive gear 129 during steering of the steering mechanism 130 of the two-wheel drive bicycle (not shown). In the ninth embodiment of the two-wheel drive bicycle (not shown) featuring a dual crown shock-absorbing front fork 164 the upper neck tube section 159 and lower neck tube section 160 are supported within the head tube 1 via bearings and externally via the attachment of the lower fork crown 165 on the lower end of the lower neck tube section 160 and by attachment to the upper fork crown 172 to the upper neck tube section 159. Moreover, the front wheel drive could easily be located in the left fork tube 173. Finally, the use of rigid shaft sections may be replaced in some places by short sections of cable (not shown) provided that the resulting flex and twist of the cable will not adversely affect the instantaneous power transfer from the rear wheel to the front wheel or result in additional friction or power loss to the front wheel due to cable wind.

Figure 26:
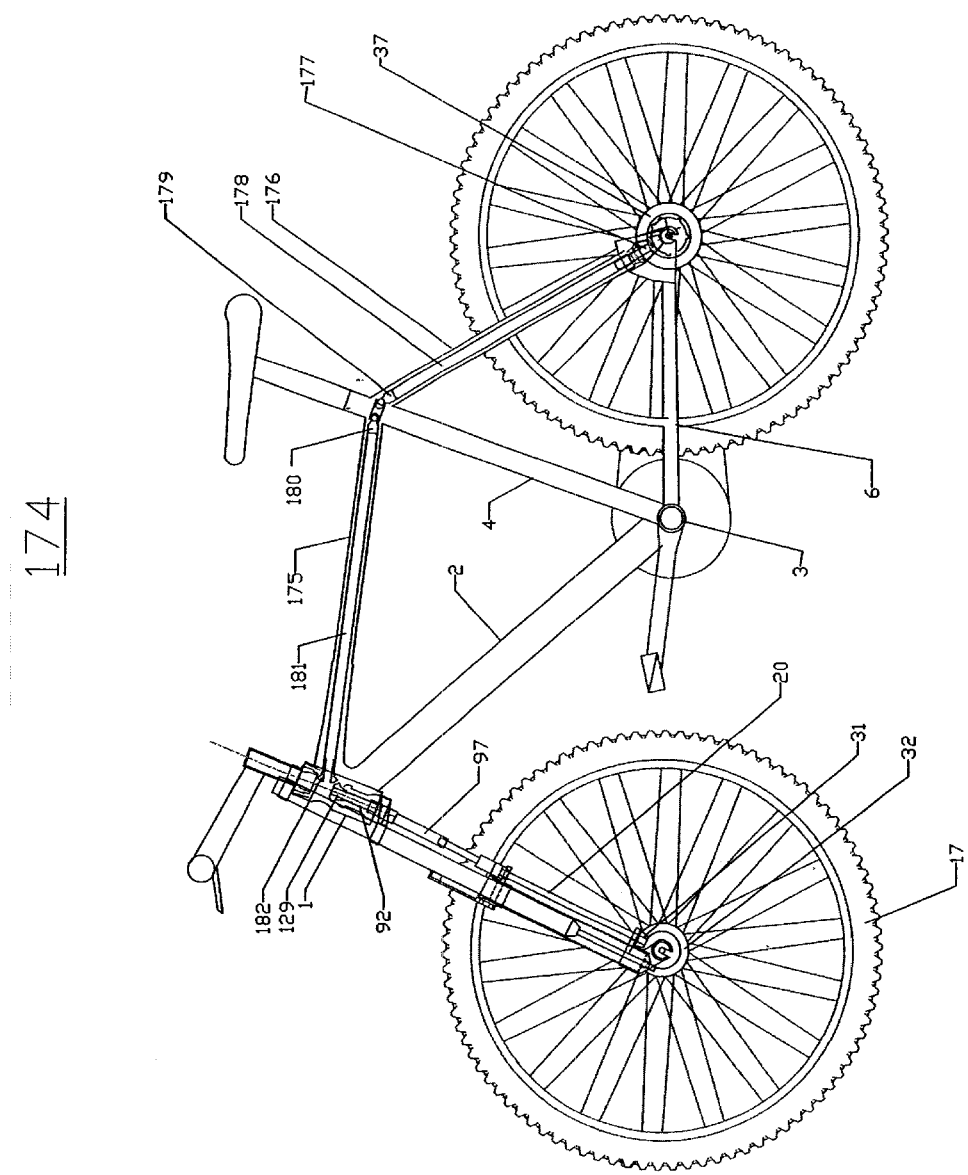
FIG. 26 is a side view of a double diamond bicycle frame configuration incorporating the front wheel drive into the frame utilizing a mid-frame linkage in the front wheel drive system.

Tenth Embodiment of the Two-Wheel Drive Bicycle Featuring a Double Diamond Frame Configuration FIG. 26 illustrates a two-wheel drive bicycle 174 wherein the front wheel drive is integrated into a "double diamond" frame design commonly found on mountain bikes, road bikes, touring or commuting bicycles, comfort bicycles, BMX and other common bicycle types. More specifically, the "double diamond" frame design differs from the frame designs previously disclosed at FIG. 13 by replacing the straight main drive tube 86 and straight main frame tube (not shown in FIG. 13) with a center drive tube 175, a left rear drive tube 176 and a right seat support tube (not shown). Additionally, the frame of the two-wheel drive bicycle 174 shown in the tenth embodiment includes a head tube 1, a down tube 2, a crank tube 3, a seat tube 4, a left chain stay 6, and a right chain stay (not shown).

In the tenth embodiment of the two-wheel drive bicycle, the rear wheel bevel gear 37 meshes with a left rear drive shaft gear 177 that is attached to and which transfers power to a left rear drive shaft 178 located within the left rear drive tube 176. A first ball spline universal joint 179 and a second ball spline universal joint 180 attach in sequence to the front end of the left rear drive shaft 178 and to the rear end of a center drive shaft 181 located within the center drive tube 175. The disclosed configuration enables the front wheel drive to accommodate the frame tube connection angles of the double diamond frame. Alternate configurations (not shown) would utilize only a single ball spline universal joint or other universal joints or linkages to negotiate the double diamond frame angle between the center drive tube 175 and the left rear drive tube 176. As previously described, both the center drive shaft 181 and left rear drive shaft 178 are supported at each end within the frame by roller bearings (not shown). Additionally, the front wheel drive could be located on either the left side or right side of the rear wheel.

As shown in FIG. 26, the center drive shaft 181 transmits power to the front drive via a center drive shaft gear 182 located within the head tube 1. The center drive shaft gear 182 interfaces with a second front drive gear 129 that delivers power through the short connecting shaft 92, the expandable universal joint system 97, the front drive shaft 20, to the front pinion gear 31 which meshes with and powers the front bevel gear 32 that is attached to and drives the front wheel 17.

The disclosed double diamond frame configuration for the two-wheel drive bicycle 174 with a first ball spline universal joint 179 and a second ball spline universal joint 180 is not to be construed as limiting the present invention. Those skilled in the art will recognize alternative designs for a double diamond frame, including similar designs found on road, commuter, touring, comfort, BMX, and other bicycle frame styles. Additionally, the disclosed first ball spline universal joint 179 is not to be construed as limiting since a universal joint featuring pins, as disclosed in the prior embodiments could easily substitute as a suitable rear linkage for the front wheel drive. Moreover, very short sections of flexible cable (not shown) could be utilized provided the angle between the left rear drive tube 176 and center drive tube 175 permits rotation of the flexible cable without causing any significant friction, power loss, or delay in power transmission of power to the front wheel due to twisting of the short cable length. Those skilled in the art will understand alternative designs for an adjustable and flexible rear linkage that accommodates the linkage in the double diamond frame configuration.

Figure 27:
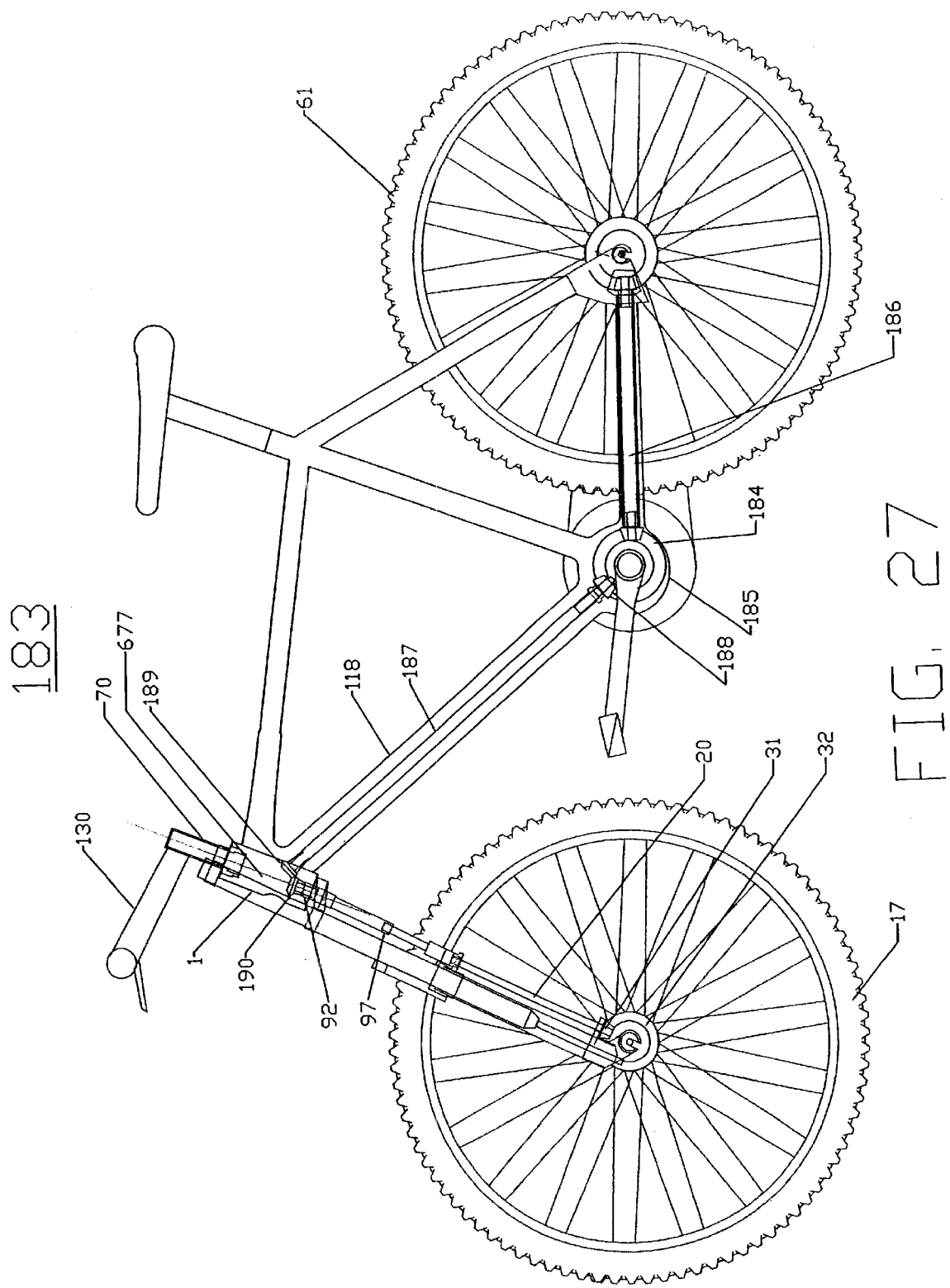
FIG. 27 is a side view of a two-wheel drive bicycle with the front wheel drive originating directly from a transmission located within the crank tube.

Eleventh Embodiment of the Two-Wheel Drive Bicycle Illustrating a Front Wheel Drive Originating Directly from an Automatic Transmission Located within the Crank Tube FIG. 27 is a side view of the eleventh embodiment of a two-wheel drive bicycle 183 with the front wheel drive originating directly from an automatic transmission 184 located within a transmission crank tube 185. The automatic transmission 184 powers the rear wheel 61 directly via a rear wheel drive shaft 186 as is well known in the art. In the present embodiment, a down drive tube 118 attaches at one end to the head tube 1 and the other end to the transmission crank tube 185 of the bicycle frame. A down tube drive shaft 187 within the down drive tube 118 attaches to a first down tube drive shaft gear 188 at its lower end that receives power directly from the automatic transmission 184 to power the down tube drive shaft 187 which in turn drives a second down tube drive shaft gear 189 attached to the down tube drive shaft 187 within the head tube 1. Alternatively, the down tube drive shaft gear 189 could attach to the down tube drive shaft 187 very near the head tube provided the rotational torque of the front wheel drive does not disrupt steering. The second down tube drive shaft gear 189 rotationally meshes with and drives a second head tube gear 190 that is also located within the head tube 1, which in turn delivers power to the front wheel 17 through the short connecting shaft 92, the expandable universal joint system 97, the front drive shaft 20, to the front pinion gear 31 which meshes with and powers the front bevel gear 32 that is attached to and powers the front wheel 17.

As discussed in the previous embodiments, the two-wheel drive bicycle includes a shock-absorbing front fork with an expandable universal joint system 97 to adjust to the lengthening of the fork. Additionally, the neck tube 70 includes a cut away section 677 to enable the rotation of the steering mechanism 130 around the second down tube drive shaft gear 189 and the second head tube gear 190.

Twelfth Embodiment of the Two-Wheel Drive Bicycle Illustrating Alternate Front Wheel Drive Configurations FIG. 28 shows a side view of the twelfth embodiment a two-wheel drive bicycle 191 featuring a hydraulic front wheel drive within the frame to power the front wheel 17. Hydraulic drives are well known in the art and, as illustrated in the present embodiment, a hydraulic drive converts the rotational power of the pedals 50 into pressurized hydraulic fluid that drives the front wheel. More specifically, a hydraulic pump 192 is mounted within the hydraulic drive crank tube 193 and is pressurized by rotation of the pedals 50. Hydraulic fluid (not shown) is forced by the hydraulic pump 192 through a hydraulic line 194 that is internalized within the hydraulic drive frame tube 195, and then through the hydraulic drive head tube 196, before descending down along (or within) left fork tube 197 of the two-wheel drive bicycle 191. The hydraulic line, in fact, could be located within any frame tube and could also be enclosed within the hydraulic left fork tube 197 or the hydraulic right fork tube (not shown). A hydraulic impeller 198 rotationally attaches to the front wheel 17 and is powered by the hydraulic fluid that is forced through the hydraulic line 194 from the hydraulic pump 192. The hydraulic fluid drives the hydraulic impeller 198 which in turn drives the front wheel 17 of the bicycle and then returns via a return hydraulic line 199 to the hydraulic pump 192. In the present embodiment, the neck tube 70 also features a cut away section to enable rotation of the steering mechanism 130 and neck tube 70 around the hydraulic line 194 and return hydraulic line 199 within the hydraulic drive head tube 196.

The disclosed configuration for the two-wheel drive bicycle with hydraulic front wheel drive is not to be construed as limiting the present invention. Portions of the hydraulic drive could easily be placed external to the frame at certain points, including along the hydraulic drive frame tube 195 and hydraulic drive head tube 196. Moreover, the hydraulic drive could be substituted in its entirety with short sections, combinations, or assemblies of shafts, belts or chains located within the frame and originating either from the rear wheel or from the crank tube section of the frame provided that the steering remained unimpaired and there is minimal added friction to the front wheel drive. Additionally, since noise is a key factor to the choice of the internal drive system, any internal drive system should be configured to minimize noise. The present embodiment, with the hydraulic line 194, 199 integrated into the head tube 1 features a neck tube 70 with a cut away section as previously disclosed to enable the full range of steering of the bicycle. The two-wheel drive bicycle of the current embodiment could also feature front and rear suspension provided the hydraulic line 194, 199 is flexible along the suspension points. The two-wheel drive bicycle featuring a hydraulic front wheel drive could also be driven by a hydraulic pump driven by the rear wheel (not shown).

Additionally, those skilled in the art will recognize that a ball bearing drive system could easily replace the hydraulic drive system by replacing the hydraulic fluid, pump, rotor, and lines with comparable components of known ball bearing drive systems. Finally, the hydraulic drive or other front wheel drive could be located at the rear hub of the bicycle and the hydraulic pump could be driven by the power of a conventional chain and sprocket configuration.

Thirteenth Embodiment of the Two-Wheel Drive Bicycle Illustrating a One-Way rear Hub with Roller Clutch FIGS. 29 and 30 illustrate top down views of a one-way rear hub 200 with a roller clutch 201. In the present embodiment, the one-way rear hub 200 further includes an outer hub shell 202 and an inner hub shell 203, said outer hub shell 202 including a disk brake mounting surface 204 at one end and said inner hub shell 203 including a short body cassette 205 at one end and a roller clutch surface 206 at the other end. A rear axle 64 is rotationally supported within the short body cassette 205 of the inner hub shell 203 with a first axle bearing 207 and within the disk brake mounting surface 204 of the outer hub shell 202 by a second axle bearing 208 to enable the one way rear hub 200 with roller clutch 201 to rotate on the rear axle 64. An axle end cap 209 secures the rear axle 64 within the one-way rear hub 200 at the second axle bearing 208 and holds the outer hub shell 202 and inner hub shell 203 together laterally. A hub bearing 210 supports the lateral forces between the outer hub shell 202 and inner hub shell 203 allowing the outer hub shell 202 and inner hub shell 203 to rotate independently. The rear axle 64 is attached to the frame of the bicycle (not shown) at the right rear dropout 7 and the left rear dropout 8.

In the present embodiment of the one-way rear hub 200, the rear drive sprockets 22 attach to the inner hub shell 203 at the short body cassette 205. The engagement clutch 220 shown in the fifteenth embodiment or, alternatively, the rear wheel bevel gear 37 shown in this embodiment of the one-way rear hub 200 attaches via bolts (not shown) to the disk brake mounting surface 204 of the outer hub shell 202.

As illustrated, the straight main drive shaft 87 of the front wheel drive is enclosed within the straight main drive tube 86 on the left side of the two-wheel drive bicycle (not shown) and meshes with the rear wheel bevel gear 37 via a drive shaft pinion gear 38. In the present embodiment, a disk brake rotor 211 also attaches to the disk brake mounting surface 204. Finally, the outer hub shell 202 attaches to the spokes (not shown) of the rear wheel (not shown) as is well known in the art.

The roller clutch 201 is well known in the art and consists of inner and outer cylinders (not shown) defining an internal space in which a series of rollers (not shown) is contained. The inner cylinder further includes a series of ramp-like structures (not shown) separating each individual roller. During operation of the roller clutch, rotation of the inner cylinder in one direction forces the rollers down to the bottom of the ramps and permits the inner cylinder to rotate in a direction opposite the outer cylinder. However, when the inner cylinder of the roller clutch (not shown) rotates in the other direction the rollers (not shown) roll up the ramp-like structures (not shown) and wedge near the top of the ramp-like structures of the inner cylinder wedging against the outer cylinder. The wedging of the rollers between the inner and the outer cylinders of the roller clutch rotationally locks the inner cylinder against the outer cylinder forcing them to rotate together.

As shown in FIG. 29 of the one-way rear hub 200, the roller clutch 201 and a second roller clutch 212 are press fitted into the outer hub shell 202. The roller clutch surface 206 of the inner hub shell 203 then slides into the roller clutch 201 and second roller clutch 212. Thus, rotational locking of the roller clutch 201 and the second roller clutch 212 results in a corresponding rotational locking of the inner hub shell 203 with the outer hub shell 202. In this way, power transmitted through the rear drive sprockets 22, to the inner hub shell 203 is transferred through the rotationally locked roller clutch 201 and rotationally locked second roller clutch 212 to the outer hub shell 202 that attaches to and powers both the rear drive bevel gear 37 and rear wheel (not shown). In this manner, the one-way rear hub 200 ceases to free wheel and further, operates efficiently resulting in minimal noise and wheel backlash providing the rider unique advantages in both mountain and road biking and racing.

The use and configuration of the one-way rear hub 200 is not to be construed as limiting and alternate configurations are envisioned. An alternative configuration would feature a right side rear wheel bevel gear (not shown) attached to the rear drive sprockets 22 resulting in a front drive system (not shown) integrated into the frame of the bicycle on the right side of the bicycle. Additionally, a single roller clutch, or alternatively, more than two roller clutches could easily be included within the one way rear hub 200. Finally, the outer hub shell 202 and inner hub shell 203 may be made of aluminum or any other light-weight metal capable of withstanding the axial forces generated by rotation of the one-way rear hub 200. Reinforcing sleeves around the outer hub shell 202 are not necessary in the present embodiment.

Fourteenth Embodiment of the Two-Wheel Drive Bicycle Illustrating a One-Way Front Hub with Roller Clutch and Torque Limiting Clutch FIG. 31 is a front view of a one-way front hub 213 for a two-wheel drive bicycle with a front roller clutch 214. In the present embodiment, the one-way front hub 213 includes an outer front hub shell 215 and an inner front hub shell 216. The inner front hub shell 216 further includes a front hub roller clutch surface 217. In the present embodiment, the inner front hub shell 216 and front hub roller clutch surface 217 are separate pieces to accommodate a torque limiting clutch assembly 299 discussed below and the inner front hub shell 216 further includes an inner hub spring shaft 312. However, the inner front hub shell 216 with front hub roller clutch surface 217 could also be a single piece in configurations without a torque-limiting clutch assembly 299.

A front axle 59 rotationally attaches within the inner hub shell 216 and is supported via a first front hub axle bearing 218 and near its other end within the outer hub shell 215 via a second front hub axle bearing 219. A third front hub axle bearing 306 may also be utilized to add support to the axle within the one-way front hub 213. The front axle 59 attaches at each end to the right front dropout 17 and left front dropout 18 of the front fork (not shown) of the two-wheel drive bicycle (not shown) and is held in place within the hub by a front hub end cap 304. A front hub bearing 305 is positioned between the outer hub shell 215 and inner hub shell 216 allowing the outer hub shell 215 and inner hub shell 216 to rotate independently while supporting the lateral forces of the one-way front hub 213. The outer front hub shell 215 further attaches to the spokes (not shown) of the front wheel (not shown) as is well known in the art. The outer front hub shell 215 may also attach to a disk brake rotor 300 as shown in the present embodiment.

The front bevel gear 32 attaches via bolts (not shown) to the inner front hub shell 216. A front roller clutch 214 is press fitted into the outer front hub shell 215. The front hub roller clutch surface 217 slides into the front roller clutch 214. As discussed above, this configuration enables free rotation of the outer front hub shell 215 relative to the inner front hub shell 216 when the inner front hub shell rotates in one direction. However, when pinion gear 31 of the front wheel drive (not shown) powers the front bevel gear 32, the attached inner front hub shell 216 rotates in the opposite direction and the front roller clutch 214 becomes rotationally locked resulting in the corresponding rotation of the outer front hub shell 215 and attached front wheel (not shown). Thus, in this manner, rotational power through the front wheel drive (not shown) to the front bevel gear 32 will result in rotation of the inner front hub shell 216 and the corresponding rotation of the outer front hub shell 215 and front wheel (not shown) to produce a bicycle driven by both wheels.

FIG. 32 features a disassembled view of the one-way front hub 213 with a front roller clutch 214 and also illustrating a torque-limiting clutch assembly 299. As illustrated, the inner hub shell 216 includes a first angled pressure plate 301 and the front hub roller clutch surface 217 includes a second angled pressure plate 302. These pressure plates fit internally to the standard one-way front hub 213. This configuration enables the front wheel drive (not shown) to rotate independently from the front wheel (not shown) in the event that extreme torque loads are transferred through the front wheel drive so that they can be relieved without damage to the system.

In the present embodiment, the first angled pressure plate 301 is circumferentially molded to the inner hub shell 216. The second angled pressure plate 302 is molded to the front hub roller clutch surface 217. The first angled pressure plate 301 abuts the second angled pressure plate 302 and is held in constant static contact with the second angled pressure plate 302 by an adjustable pressure plate spring 303. A first pressure plate spring end 309 of the adjustable pressure plate spring 303 is positioned within, and applies pressure at the inner pressure plate surface 307 of the front hub roller clutch surface 217 while a second pressure plate spring end 311 of the adjustable pressure plate spring 303 attaches to an adjustable pressure plate spring stop 308 that attaches to the end of the inner hub spring shaft 312. In the present embodiment, the adjustable pressure plate spring stop 308 screws into position onto the inner hub spring shaft 312 thus making the tension of the adjustable pressure plate spring 303 adjustable depending upon how far the adjustable pressure plate spring stop 308 is screwed onto the inner hub spring shaft 312. The adjustable pressure plate spring stop 308 is rotationally supported against the outer hub shell 215 by the front hub bearing 305 and the inner hub spring shaft 312 is rotationally supported on the front axle 59 by the third front hub axle bearing 306.

The constant contact of the first angled pressure plate 301 with the second pressure plate 302 enables the transfer of rotational forces from the front bevel gear 32 through the inner hub shell 216 and torque limiting clutch assembly 299, through the front roller clutch 214, to the outer hub shell 215 to drive the front wheel 17. However, upon the transfer of a severe rotational torque load through the front wheel drive (not shown) that may otherwise cause breakage of certain front wheel drive parts, the rotational torque overcomes the static contact of the first angled pressure plate 301 against the second angled pressure plate 302 forcing the first angled pressure plate 301 to slip relative to the second angled pressure plate 302 by causing a shortening of the adjustable pressure plate spring 303. Severe drive system torque is, therefore, relieved and the first angled pressure plate 301 and second angled pressure plate 302 resume their static contact due to the pressure from the adjustable pressure plate spring 303.

A roller clutch hub is uniquely suited for a two-wheel drive bicycle because it transmits power virtually instantaneously and silently to the front wheel. The use of a ratcheting one-way clutch would result in a slight delay in transfer of power to the front when the rear wheel slips because there are several degrees of backlash before the ratchet would engage to power the front wheel.

An additional advantage to using a roller clutch in a front hub, as disclosed herein, is that since the two-wheel drive bicycle can be ridden in either two-wheel drive or rear-wheel-only drive, the use of a ratcheting one-way hub would result in a constant ratcheting sound when the front wheel free wheels. Moreover, the thirteenth embodiment also discloses the use of at least two roller clutches in the rear bicycle hub of the two-wheel drive bicycle. The use of more than one roller clutch provides greater surface area to spread the radial forces of the driven rear wheel. The ability to spread the forces along a greater surface eliminates the need for reinforcement sleeves resulting in lighter hubs.

The use and configuration of the one-way front hub 213 with a roller clutch 214 and torque limiting one-way front hub clutch assembly 299 is not to be construed as limiting and alternate configurations are envisioned. One alternate configuration would utilize a sprag clutch (not shown) in place of the front roller clutch 214. Additionally, more than one roller clutch 214 could be included within the one-way front hub 213. For the one-way front hub 213, the outer front hub shell 215 and inner front hub shell 216 may be made of aluminum or any other light-weight metal capable of withstanding the axial and rotational forces generated by rotation of the one-way front hub 213 and the use of any particular material should not be considered as limiting to the present invention. Additionally, reinforcing sleeves around the outer front hub shell 215 are not necessary in the present embodiment. Finally, numerous configurations for the torque limiting clutch 299 are envisioned and the use of pressure plates 301, 302 and pressure plate springs should not be construed as limiting the mechanisms by which severe front wheel drive torque can be relieved.

Fifteenth Embodiment of the Two-Wheel Drive Bicycle Illustrating the Front Wheel Drive Engagement Clutch Referring to FIG. 33, the fifteenth embodiment of the two-wheel drive bicycle incorporates an engagement clutch 220 into the front wheel drive (not shown). The engagement clutch 220 provides the rider the option of operating the two-wheel drive bicycle in two-wheel drive mode when the engagement clutch 220 is engaged, or alternatively, in rear-wheel-only drive mode when the engagement clutch 220 is disengaged. FIG. 33 illustrates a disassembled view of the engagement clutch 220 and the one-way rear hub 200 of the two-wheel drive bicycle (not shown). FIG. 29 shows a view of the one-way rear wheel hub 200 of the two-wheel drive bicycle. As disclosed in the present embodiment, the entire engagement clutch 220 would replace the rear bevel gear 37 shown in FIG. 29 in the space between the one-way rear wheel hub 200 and the left rear dropout 8 thus enabling use of standard frame spacings, standard rear hub dimensions, and standard bicycle components.

In the present embodiment as shown in FIG. 33, an inner clutch plate 221 attaches via bolts 222 to the disk brake mounting surface 204 of the outer hub shell 202. A clutch bearing 223 is press fitted onto the inner clutch plate's 221 outer edge 224 and a rear gear ring 225 is press fitted onto the clutch bearing 223 so that the inner clutch plate 221 and rear gear ring 225 rotate independently on the clutch bearing 223. Additionally, a flat needle bearing (not shown) may be placed between the inner clutch plate 221 and the rear gear ring 225 to support lateral forces within the engagement clutch 220. The inner edge 226 of the rear gear ring 225 is designed to receive an outer clutch plate 227. The outer clutch plate 227 has a series of rear gear ring stops 228 that fit into the series outer clutch plate receptors 229 on the inner edge 226 of the rear gear ring 225. Alternatively, the rear gear ring stops 228 and outer clutch plate receptors 229 could be replaced by any male and female spline configuration that would allow the outer clutch plate 227 and rear gear ring 225 to slide relative to each other. When assembled, the rear gear ring 225 and outer clutch plate 227 rotate in unison due to the positioning of the rear gear ring stops 228 of the outer clutch plate 227 within the outer clutch plate receptors 229 of the rear gear ring 225. The outer clutch plate 227 is held in place by a snap ring 230 inserted into a snap ring slot 231 of the rear gear ring 225.

The inner clutch plate 221 further includes a series of inner dog teeth 233 that face the outer clutch plate 227 when the engagement clutch 220 is assembled. Similarly, the outer clutch plate 227 further includes a series of outer dog teeth 234 that face the inner clutch plate 221 when the engagement clutch 220 is assembled. Each inner dog tooth 233 further includes a flat facing surface 235 and each outer dog tooth 234 further includes an opposing flat facing surface 236. Finally, the inner clutch plate 221 and outer clutch plate 227 are held apart when the engagement clutch 220 is assembled but not engaged by a circular clutch spring 237 that rests circumferentially along on the spring surface 232 of the rear bevel ring gear 225. The entire engagement clutch is positioned between the disk brake mounting surface 204 of the outer hub shell 202 and the left dropout 8 where the rear drive bevel gear 37 is positioned in FIG. 29. FIG. 36 illustrates an alternate view of the outer clutch plate 227 showing the rear gear ring stops 228, the outer dog teeth 234, and the opposing flat facing surfaces 236.

Engagement of the engagement clutch 220 in the present embodiment is facilitated by a cable-actuated external shifting mechanism (not shown). To engage the engagement clutch 220, the rider shifts a cable actuation lever (not shown) on the steering mechanism (not shown). The resulting movement of the cable forces the external shifting mechanism against the outer clutch plate 227 which moves toward the inner clutch plate 221, compressing the circular clutch spring 237. When the outer clutch plate 227 and inner clutch plate 221 filly interlock, the opposing flat facing surfaces 236 of the outer dog teeth 234 on the outer clutch plate 227 come into contact with the flat facing surfaces 235 of the inner dog teeth 233 on the inner clutch plate 221 resulting in the engagement of the engagement clutch 220.

When the engagement clutch 220 is engaged, the front wheel drive operates to transfer power to the front wheel 17 as follows. Power is transferred from the rear drive sprockets (not shown) through the one-way rear hub (not shown) as discussed in the twelfth embodiment. Rotation of the outer hub shell 202 powers the inner clutch plate 221 which transfers power through the flat facing surface 235 of inner dog teeth 233 to the opposing flat facing surfaces 236 of the outer dog teeth 234 of the interlocked outer clutch plate 227. The outer clutch plate 227 then transfers power to the rear gear ring 225 due to the interlocking of the rear gear ring stops 228 of the outer clutch plate 227 with the outer clutch plate receptors 229 of the rear gear ring 225. The rear gear ring 225 then transfers power to the front wheel drive (not shown) through the meshing drive shaft pinion gear (not shown) and straight main drive shaft (not shown) as discussed in the previous embodiments. When the engagement clutch 220 is not engaged (the two-wheel drive bicycle is being operated in rear-wheel drive mode), the inner dog tooth gears 233 of inner clutch plate 221 and outer dog tooth gears 234 of the outer clutch plate 227 are forced apart by the circular clutch spring 237 and no power is transferred through the front wheel drive.

The disclosed engagement clutch 220 for the two-wheel drive bicycle is not to be construed as limiting the present invention. Those skilled in the art will recognize alternative designs that can be incorporated into the two-wheel drive, including placement of the engagement clutch assembly on the front hub 213 of the bicycle. The clutch plates 221, 227 themselves could feature pressure plates or other alternatives to the dog-tooth gears disclosed herein. Additionally, the clutch plates 221, 227 may be made of light-weight aluminum and may be hard-coat anodized to increase strength. The engagement clutch 220 could also be positioned on the same side of the one-way rear hub as the rear drive sprockets (not shown). Additionally, the present embodiment uses a circular wave spring 237 to hold the inner and outer clutch plates 221, 227 apart. However, a variety of circular springs could be utilized. Finally, while the dimensions of an engagement clutch that fits within the standard rear wheel spacing is critical to the broadest application of standard industry equipment, including hubs and disk brake systems, alternative hub spacings are envisioned.

Figure 34:
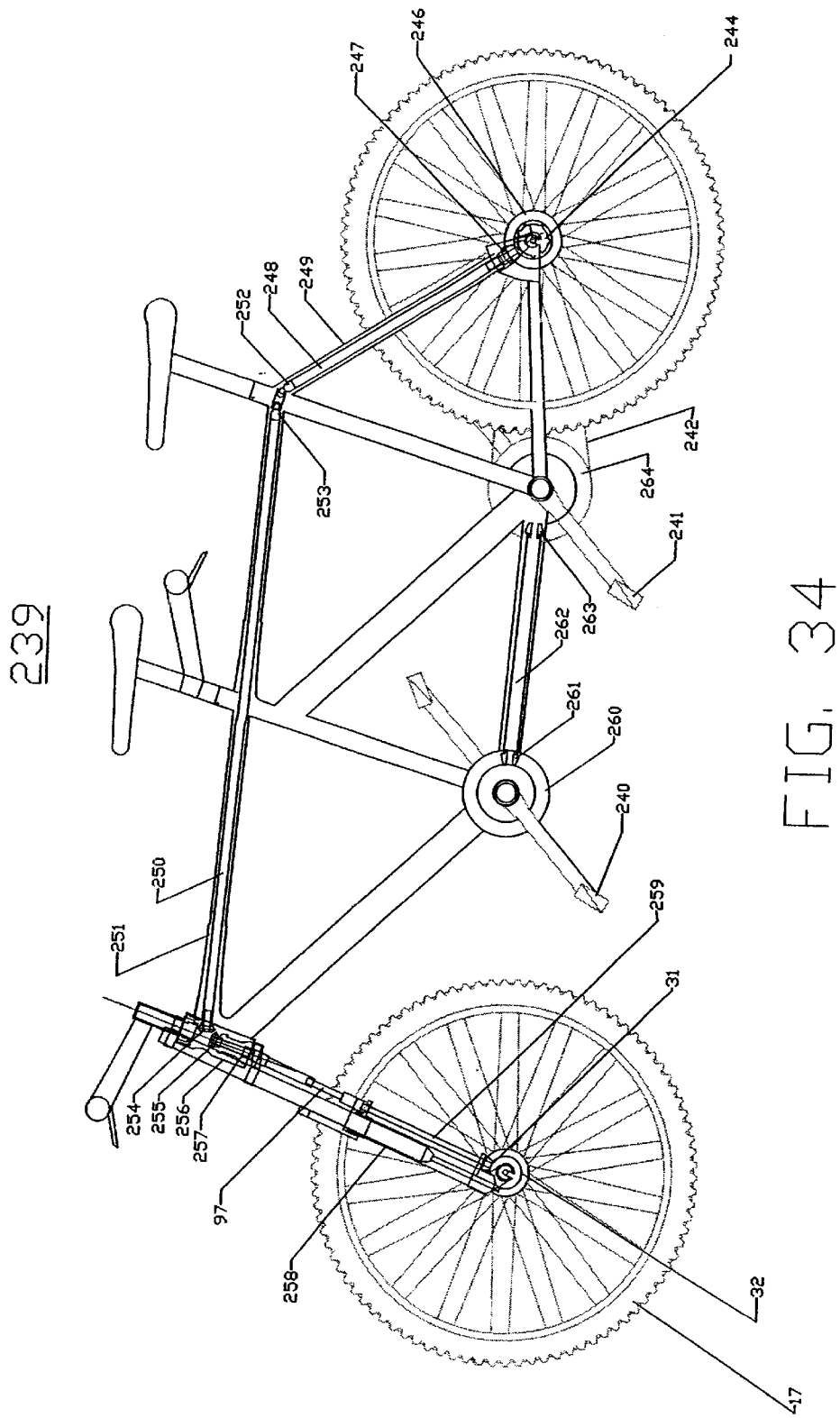
FIG. 34 is a view of a two-wheel drive tandem bicycle.

Sixteenth Embodiment of the Two-Wheel Drive Bicycle Featuring a Two-Wheel Drive Tandem Bicycle FIG. 34 illustrates a two-wheel drive tandem bicycle 239. In the sixteenth embodiment, power is transferred from the front pedals 240 of the first rider to the rear pedals 241 of the second rider. A rear drive chain 242, including a derailleur (not shown) transmits power from the first and second rider to the rear tandem drive sprockets (not shown). Power is then transferred through the rear tandem hub 244 to the front wheel 17 of the two-wheel drive tandem bike 239 via the rear tandem bevel gear 246 that rotationally meshes with a rear tandem pinion gear 247. A rear tandem drive shaft 248 attaches to the rear tandem pinion gear 247 and is contained in the rear tandem drive tube 249 of the frame. A main tandem drive shaft 250 is enclosed within the horizontal tandem frame tube 251 and attaches to the rear tandem drive shaft 249 via a first rear ball spline universal joint 252 and a second rear ball spline universal joint 253. A first tandem head tube gear 254 attaches to the front end of the main tandem drive shaft 250 to complete the transfer of power through the frame of the two-wheel drive tandem bicycle 239. A second tandem head tube gear 255 rotationally meshes with the first tandem head tube gear 254 within the tandem head tube 256 and transfers power through an attached tandem head tube shaft 257 to an expandable universal joint system 97. Finally, power is transferred down the tandem front fork 258 via a tandem front fork shaft 259 attached at its upper end to the expandable universal joint system 97 and at its lower end to the front pinion gear 31. The front pinion gear 31 then transmits power to the front bevel gear 32 to power the front wheel 17.

The disclosed two-wheel drive tandem bicycle 239 is not to be construed as limiting the present invention. Those skilled in the art will recognize alternative designs that can be incorporated into the two-wheel drive tandem bicycle 239, including use of a shock-absorbing front fork (not shown) and enclosed front wheel drive as previously discussed in the third, fifth, eighth and ninth embodiments. Additionally, the main tandem drive shaft 250 may include bearing supports or linkages in order to more firmly support the tandem drive shaft 251 within the frame or may originate in from a crank tube transmission as disclosed in the eleventh embodiment. An engagement clutch 220, as disclosed in the thirteenth embodiment could be used in the present invention. Finally, the present embodiment discloses the use of a front pedal bevel gear 260 a front pedal pinion gear 261 a short pedal shaft 262, a rear pedal pinion gear 263 and a rear pedal bevel gear 264 between the front pedals 240 of the first rider and the rear pedals 241 of the second rider to transfer power to the rear drive chain 242. Of course, the traditional dual tandem drive chain (not shown) setup found on a traditional tandem bike could be utilized.

Figure 35:
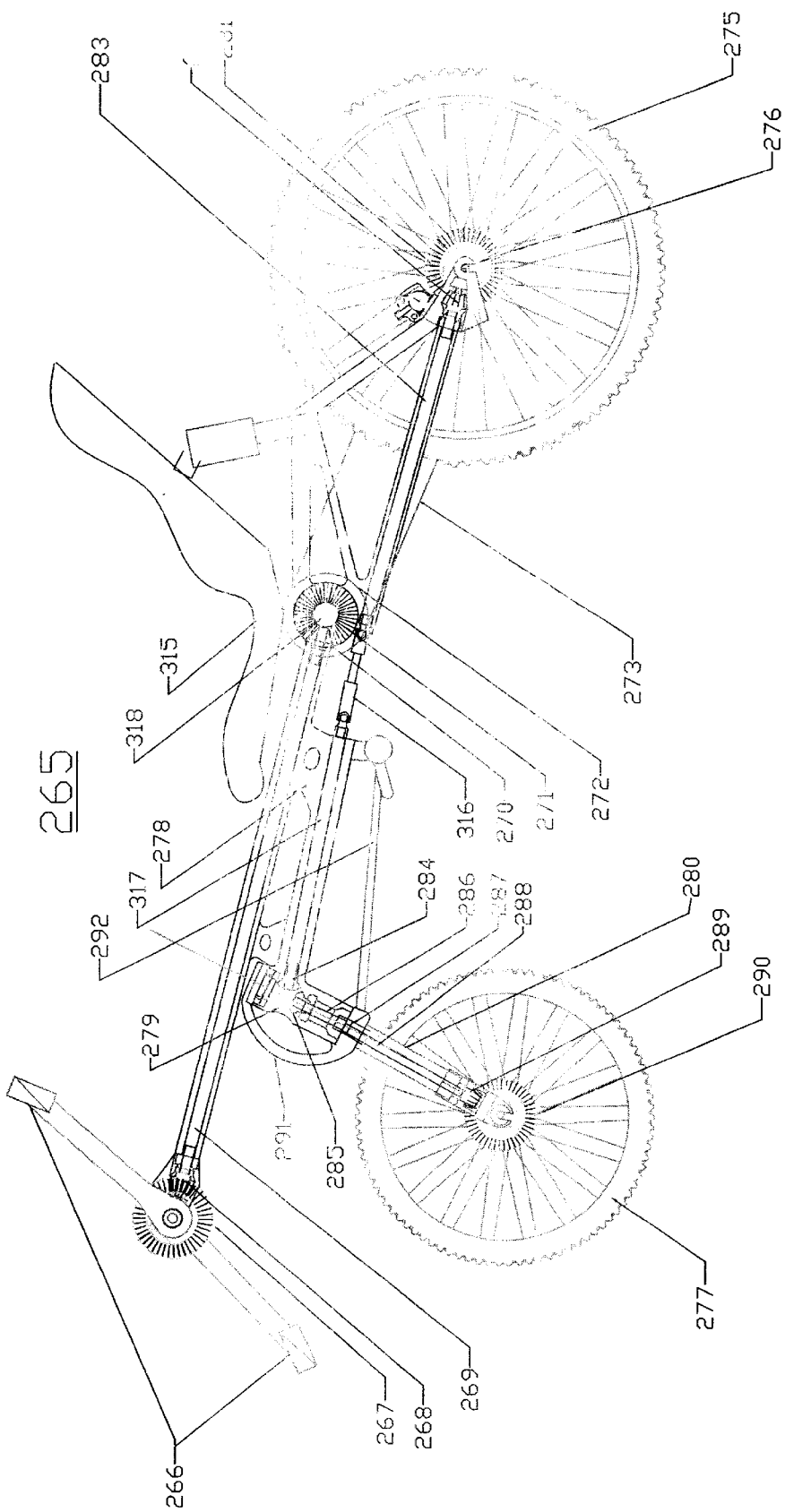
FIG. 35 is a view of a two-wheel drive recumbent bicycle with a partially shaft-driven rear wheel.

Seventeenth Embodiment of the Two-Wheel Drive Bicycle Featuring a Two-Wheel Drive Recumbent Bicycle FIG. 35 is a view of a two-wheel drive recumbent bicycle 265 with partially shaft-driven rear wheel. In the seventeenth embodiment, power is transferred from the rider to a pair of recumbent pedals 266 to a pedal gear 267 that meshes with and drives a pedal drive shaft gear 268. A pedal drive shaft 269 connects to the pedal drive shaft gear 268 to transmit power to an attached front sprocket gear 270 that meshes with and drives a recumbent sprocket gear 271. The recumbent sprocket gear 271 transmits power to a rotationally attached recumbent drive sprocket 272 that transmits power through a standard-length drive chain 273 to the rear recumbent sprockets (not shown) that are mounted on and provide power to a recumbent rear wheel 275.

This rear wheel drive configuration is preferred because it eliminates the use of an extra-long recumbent bike drive chain (not shown) from the recumbent pedals 266 to the recumbent rear wheel 275. An extra-long recumbent drive chain (not shown) has both a tendency to skip off the drive gears as well as create a hazard to the rider because extra long drive chain is located so close to the rider's legs. In fact, this rear wheel drive configuration could be utilized in a recumbent bicycle regardless of whether a front wheel drive is incorporated into the design.

In the current embodiment, power is transferred from the rear recumbent wheel 275 through a rear recumbent hub 276 to a front recumbent wheel 277 of the two-wheel drive recumbent bicycle 265 through a front wheel drive located substantially within a recumbent frame 278 and passing through a recumbent head tube 279 and internally through a recumbent fork tube 280 via a series of shafts and gears as previously disclosed in the previous embodiments. More specifically, a rear recumbent hub gear 281 attached to the rear recumbent hub 276 meshes with and transfers power to a rear recumbent drive shaft gear 282 that is attached to the rear end of a rear recumbent drive shaft 283. The rear recumbent drive shaft 283 connects at its front end with and transfers power through a recumbent ball spline universal joint system 316 that is attached to a front recumbent drive shaft 317. The recumbent ball spline universal joint system 316 is similar to the ball spline universal joint systems disclosed in the earlier embodiments and is useful in the present embodiment to adjust for movement of the rear recumbent wheel 275 around a rear suspension pivot point 318 of the rear suspension located beneath the recumbent seat 315.

The transmission of power from the front recumbent drive shaft 317 through the recumbent head tube 279 occurs via a first recumbent head tube gear 284 attached to the front recumbent drive shaft 317 that meshes with and drives a second recumbent head tube gear 285. The power is then transferred from the second recumbent head tube gear 285 to the recumbent front wheel 277 through an attached short recumbent head tube shaft 286 to a front recumbent universal joint system 287 to a front recumbent drive shaft 288 which includes a front recumbent fork gear 289 at its lower end. The front recumbent fork gear 289 rotationally meshes with and drives a front recumbent drive gear 290 that is attached to the front recumbent wheel 277. In the present embodiment, the front wheel drive is enclosed within the recumbent fork tube 280 from within or proximate the recumbent head tube 279 to the recumbent front wheel 277.

In the present embodiment, a recumbent steering mechanism 292 includes a recumbent neck tube support bridge 291 that further supports an upper recumbent neck tube 318 and a lower recumbent neck tube 319 within the recumbent head tube 279. As in the other embodiments, the presence of the upper recumbent neck tube 318 and lower recumbent neck tube 319 together with the external support of the recumbent neck tube support bridge 291 outside the recumbent head tube 279 enables a full range of turning of the recumbent steering mechanism 292 and the recumbent front wheel 277 around the recumbent head tube 279.

Numerous alternative configurations are possible as recumbent bicycles often do not have the same front configuration of a typical bicycle. In those situations, it remains important to locate a component of the front wheel drive on the axis of steering to limit torque responses. Additionally, enclosing the front wheel drive within the frame will maintain the aesthetics of the bicycle as well as limit rider exposure to moving drive parts.

The front wheel drive of the two-wheel drive recumbent bicycle 265 may also include an engagement clutch 220 or single crown shock absorbing front fork 151 as disclosed previously. Moreover, the two-wheel drive recumbent bicycle 265 could utilize a long drive chain from the recumbent pedals 266 to the rear recumbent wheel 275 as is well known in the art. Alternatively, a single long drive shaft and automatic transmission (not shown) could be used within the rear hub to provide power from the recumbent pedals 266 to the recumbent rear wheel 275. Similarly, an automatic transmission as disclosed in the eleventh embodiment could be located below the recumbent seat 315 to mesh directly with a second recumbent drive shaft (not shown) in order to power the rear wheel. A fifth alternative rear wheel drive configuration would utilize a standard-length drive chain and shifting system at the front wheel leading to the drive gears being located approximately mid-frame. Drive shafts (not shown) a rear drive shaft would then power the rear wheel, and a front drive shaft would then be contained within the frame from the drive gears, through the head tube, and down the front fork to the front wheel.

The disclosed two-wheel drive recumbent bicycle 265 is not to be construed as limiting the present invention. Those skilled in the art will recognize alternative designs that can be incorporated into the two-wheel drive recumbent bicycle 265 that result in effective power transfer through the frame to the front wheel and also to the rear wheel via a shaft and drive chain combination.

In considering this invention, it should be remembered that the present disclosure is only illustrative, and the scope of the invention is not intended to be limited to the embodiments disclosed herein. This invention discloses both the design and the construction of a two-wheel drive all terrain bicycle with a shock-absorbing front fork and rear suspension wherein the front wheel drive is entirely enclosed within the front fork. Alternative frame configurations and front wheel drive embodiments for a two-wheel drive bicycle are also disclosed including double diamond bicycles, four-bar linkage suspension bicycles, tandem bicycle and recumbent bicycle. Additional embodiments disclose aspects of the front wheel drive that include one-way front and rear hubs using a roller clutch, an engagement clutch, and a torque limiting clutch.

Importantly, the embodiments and inventions disclosed herein are useful and may be incorporated interchangeably into other embodiments. To illustrate the numerous scenarios, the two-wheel drive rear suspension mountain bike 111 disclosed in the sixth embodiment could include either the single crown shock absorbing front fork 151 disclosed in the eighth embodiment or the dual crown shock-absorbing front fork 164 disclosed in the ninth embodiment to completely enclose the front wheel drive within the front fork. Furthermore, the two-wheel drive rear suspension mountain bike 111 could include the one-way rear hub with roller clutch 200 and engagement clutch 220 at its rear wheel 61, as shown in the thirteenth and fifteenth embodiments, and a one-way front hub with roller clutch 213 including a torque-limiting clutch 299 at its front wheel 17, as shown in the fourteenth embodiment.

Similarly, the two-wheel drive double diamond bicycle 174 disclosed in the tenth embodiment, the two-wheel drive bicycle featuring a four-bar linkage front suspension system 131 disclosed in the seventh embodiment, the two-wheel drive bicycles with alternate wheel drives disclosed in the eleventh and twelfth embodiments (183 and 191, respectively) and the two-wheel drive tandem bicycle 239 disclosed in the sixteenth embodiment could include the single crown shock absorbing front fork 151 disclosed in the eighth embodiment or the dual crown shock-absorbing front fork 164 disclosed in the ninth embodiment to completely enclose the front wheel drive within the front fork. Furthermore, the two-wheel drive double diamond bicycle 174 disclosed in the tenth embodiment, the two-wheel drive bicycle featuring a four-bar linkage front suspension system 131 disclosed in the seventh embodiment, the two-wheel drive tandem bicycle 239 disclosed in the sixteenth embodiment, and the two-wheel drive recumbent bicycle 265 disclosed in the seventeenth embodiment could further include the one-way rear hub with roller clutch 200 and engagement clutch 220 at its rear wheel 61 as shown in the thirteenth and fifteenth embodiments and a one-way front hub with roller clutch 213 including a torque-limiting clutch 299 at its front wheel 17 as shown in the fourteenth embodiment.

In general, the disclosed front wheel drive could be utilized similarly in any two-wheel drive two-wheeled vehicle including motorcycles, mopeds, and pedal assist vehicles. The transfer of the power from the rear wheel (as in the second and sixth embodiments) or the center drive transmission (as in the eleventh embodiment) is accomplished through a rigid drive system, internal to the vehicle frame that enables a full range of steering, maintains vehicle aesthetics, and prevents rider injury from exposed front wheel drive part. Furthermore, the rigid shaft system provides virtually instantaneous power transfer to the front wheel for any two-wheeled vehicle. Also, location of front wheel drive components on the axis of steering minimizes torque reactions from the rotation of the front wheel drive as the front wheel is driven.

A two-wheel drive two-wheeled vehicle would have increased traction and mobility of the front wheel, especially during uphill climbs and downhill cornering on loose or slippery material. The shock-absorbing front fork and rear suspension ensures a smoother ride and greater contact of the front wheel with the terrain for all-around improved rider experience. The engagement clutch further enhances the utility of the front wheel drive providing the rider the option of rear-wheel-only or two-wheel drive. The invention discloses an excellent method of manufacturing a functional two-wheel drive two-wheeled vehicle with all the disclosed embodiments. As envisioned, this fully integrated front wheel drive would not only compete with the most advanced vehicles on the market but would also create an entirely new category in numerous industries.

While the foregoing is directed to the first through seventeenth embodiments of the present invention, other and further embodiments of the invention may be devised without departing from the basic scope thereof, which scope is determined by the claims that follow.

We claim:

1. A front fork assembly for a two-wheel drive two-wheel vehicle which includes a rear wheel drive assembly, a front wheel drive assembly, and a frame having a head tube, the front fork assembly comprising:

a neck tube configured to be disposed at least partially within the head tube;

said neck tube defining a cut away portion to permit a portion of the front wheel drive assembly to pass therethrough and to enable rotation of said neck tube around the portion of the front wheel drive assembly and having an upper end and a lower end;

a fork crown attached to the lower end of the neck tube;

a left fork member attached to said fork crown;

a right fork member attached to said fork crown opposite said left fork member;

said left fork member and said right fork member including a dropout at a distal end of each said fork member, said dropout attachable to a front wheel.

2. The front fork assembly according to claim 1, wherein said cut away portion is defined between an upper neck tube section and a lower neck tube section.

3. The front fork assembly according to claim 1, wherein said fork crown and one of said left fork member and said right fork member are configured to enclose the front wheel drive assembly from said neck tube to one of said dropouts.

4. The front fork assembly according to claim 1, further comprising a shock-absorbing suspension system.

5. A front fork assembly for a two-wheel drive two-wheel vehicle which includes a rear wheel drive assembly, a front wheel drive assembly, and a frame having a head tube, the front fork assembly comprising:

a neck tube configured to be at least partially disposed within the head tube;

said neck tube including an upper neck tube section and a lower neck tube section together defining a cut away configured to permit a portion of the front wheel drive assembly to pass therethrough and to enable rotation of said neck tube around a portion of the front wheel drive assembly;

a fork crown attached to the lower end of the neck tube;

a left fork member attached to said fork crown; and a right fork member attached to said fork crown.

6. The front fork assembly of claim 5, wherein said upper neck tube section is rotatably attachable within an upper end of the head tube by an upper head tube bearing.

7. The front fork assembly of claim 5, wherein said lower neck tube section is rotatably attachable within a lower end of the head tube by a lower head tube bearing.

8. The front fork assembly of claim 5, further comprising:

a crown support bridge coupled to said fork crown and said upper neck tube section and being configured to support said upper neck tube section and said lower neck tube section.

9. The front fork assembly of claim 5, wherein said crown support bridge is external to said head tube and is configured to rotate around said head tube when said front fork is rotated.

10. The front fork assembly of claim 5, wherein said left fork member and said right fork member include a dropout at a distal end of each said fork member, said dropout attachable to a front wheel.

* * * * *